US012748724B2

(12) United States Patent
Leonard et al.

(10) Patent No.: US 12,748,724 B2
(45) Date of Patent: Sep. 29, 2026

(54) CONVERTING A DATA STREAM INTO FILES

(71) Applicant: Capital One Services, LLC, McLean, VA (US)

(72) Inventors: Justin Leonard, Dallas, TX (US); Dennis J. Mire, Dallas, TX (US); Sarvani Maddina, Frisco, TX (US); Ravi Kalidindi, Mckinney, TX (US); Arun Gopalakrishna, McKinney, TX (US); Hyounggun Ahn, Carrollton, TX (US)

(73) Assignee: Capital One Services, LLC, McLean, VA (US)

( * ) Notice: Subject to any disclaimer, the term of this patent is extended or adjusted under 35 U.S.C. 154(b) by 30 days.

(21) Appl. No.: 18/630,398

(22) Filed: Apr. 9, 2024

(65) Prior Publication Data

US 2025/0315406 A1 Oct. 9, 2025

(51) Int. Cl.
*G06F 16/11* (2019.01)

(52) U.S. Cl.
CPC .................................. *G06F 16/116* (2019.01)

(58) Field of Classification Search
CPC ..................................................... G06F 16/116
USPC .......................................................... 707/756
See application file for complete search history.

(56) References Cited

U.S. PATENT DOCUMENTS

| | | | | |
|---|---|---|---|---|
| 8,218,941 B1 * | 7/2012 | Dagman | H04N 5/85 | 369/84 |
| 8,291,006 B2 * | 10/2012 | Andrade | G06F 16/24568 | 709/201 |
| 9,996,572 B2 * | 6/2018 | Calder | G06F 3/0605 | |
| 10,127,086 B2 * | 11/2018 | Ghare | G06F 9/5083 | |
| 2005/0097561 A1 * | 5/2005 | Schumacher | G06F 8/10 | 712/213 |
| 2009/0300615 A1 * | 12/2009 | Andrade | G06F 9/5066 | 718/100 |
| 2022/0245093 A1 * | 8/2022 | Batsakis | G06F 16/144 | |
| 2023/0006889 A1 * | 1/2023 | Thyagaturu | H04L 41/5054 | |
| 2023/0161760 A1 * | 5/2023 | James | G06F 21/6218 | 707/759 |

* cited by examiner

*Primary Examiner* — Angelica Ruiz
(74) *Attorney, Agent, or Firm* — Harrity & Harrity, LLP

(57) ABSTRACT

In some implementations, a data converter may initiate a plurality of worker nodes associated with a plurality of partitions. The data converter may query, for each worker node, a database storing the data stream. The data converter may receive, at each worker node, a portion of the data stream associated with one or more partitions, in the plurality of partitions, corresponding to the worker node. The data converter may convert the data stream into legacy format versions and upload a plurality of files. Each file in the plurality of files may encode a portion of the legacy format versions. The data converter may upload a done file based on uploading the plurality of files.

20 Claims, 19 Drawing Sheets

CONVERTING A DATA STREAM INTO FILES

BACKGROUND

A database of objects may be distributed across machines. Therefore, events that record changes to the objects (e.g., removal of an object, addition of an object, and/or modification to an object) may be streamed to the machines in order to allow for fast updating of the database.

SUMMARY

Some implementations described herein relate to a system for converting a data stream into a plurality of files. The system may include one or more memories and one or more processors communicatively coupled to the one or more memories. The one or more processors may be configured to initiate a plurality of worker nodes, wherein each worker node in the plurality of worker nodes corresponds to a unique partition in a plurality of partitions. The one or more processors may be configured to verify that each worker node has been initiated based on a file indicating a start of the worker node. The one or more processors may be configured to query, for each worker node, a database storing the data stream. The one or more processors may be configured to receive, at each worker node, a portion of the data stream associated with the unique partition corresponding to the worker node. The one or more processors may be configured to convert, at each worker node, the portion of the data stream into a legacy format version. The one or more processors may be configured to upload, from each worker node, a corresponding file, out of the plurality of files, encoding the legacy format version of the portion of the data stream. The one or more processors may be configured to upload a done file based on the plurality of worker nodes uploading the plurality of files.

Some implementations described herein relate to a method of processing a plurality of files from a data stream. The method may include detecting, using a data processor, a done file in a remote storage. The method may include determining, by the data processor, the plurality of files based on the done file. The method may include receiving, from the remote storage, the plurality of files. The method may include processing, by the data processor, the plurality of files in sequence to update a set of objects.

Some implementations described herein relate to a non-transitory computer-readable medium that stores a set of instructions for converting a data stream into a plurality of files. The set of instructions, when executed by one or more processors of a device, may cause the device to initiate a plurality of worker nodes associated with a plurality of partitions. The set of instructions, when executed by one or more processors of the device, may cause the device to query, for each worker node, a database storing the data stream. The set of instructions, when executed by one or more processors of the device, may cause the device to receive, at each worker node, a portion of the data stream associated with one or more partitions, in the plurality of partitions, corresponding to the worker node. The set of instructions, when executed by one or more processors of the device, may cause the device to convert the data stream into legacy format versions. The set of instructions, when executed by one or more processors of the device, may cause the device to upload the plurality of files, wherein each file in the plurality of files encodes a portion of the legacy format versions. The set of instructions, when executed by one or more processors of the device, may cause the device to upload a done file based on uploading the plurality of files.

DETAILED DESCRIPTION

The following detailed description of example implementations refers to the accompanying drawings. The same reference numbers in different drawings may identify the same or similar elements.

"Delimiter-separated values" ("DSVs") refer to data arrays that are organized using delimiter characters. For example, a comma-separated values (CSV) file comprises a text file (e.g., encoded using Unicode, American standard code for information interchange (ASCII), or another type of encoding) that uses commas to delimit fields and newlines to delimit records. In another example, a tab-separated values (TSV) file comprises a text file (e.g., encoded using Unicode, ASCII, or another type of encoding) that uses tabs to delimit fields and newlines to delimit records. CSV and TSV files are but two examples, however. Other DSV files may use different delimiters. Additionally, other DSV schema may allow for more than two dimensions of data.

A set of DSV files may be used to record a database of objects. Changes to the objects (e.g., removal of an object, addition of an object, and/or modification to an object) therefore result in changes to the set of DSV files.

The database of objects may be distributed across multiple computing devices. Therefore, in order to improve the speed of the database and reduce network overhead associated with updating the database, more flexible database structures may replace the set of DSV files. The more flexible structures may allow streaming of events that record changes to the objects (e.g., removal of an object, addition of an object, and/or modification to an object). The streaming is both faster and less network-intensive than promulgating an updated set of DSV files.

Streaming events, however, is not backward-compatible for data processors that still rely on DSV files to maintain the database. Therefore, accuracy of the database is decreased when a system is upgraded to stream events.

Some implementations described herein enable converting streamed events into a plurality of files (e.g., a plurality of DSV files). As a result, data processors that still rely on files to maintain a database can still receive updates, which results in a more accurate database.

FIGS. 1A-1H are diagrams of an example 100 associated with converting a data stream into files. As shown in FIGS. 1A-1H, example 100 includes a data converter, a remote storage, a database, and a data processor. These devices are described in more detail in connection with FIGS. 4 and 5.

Figure 1A:
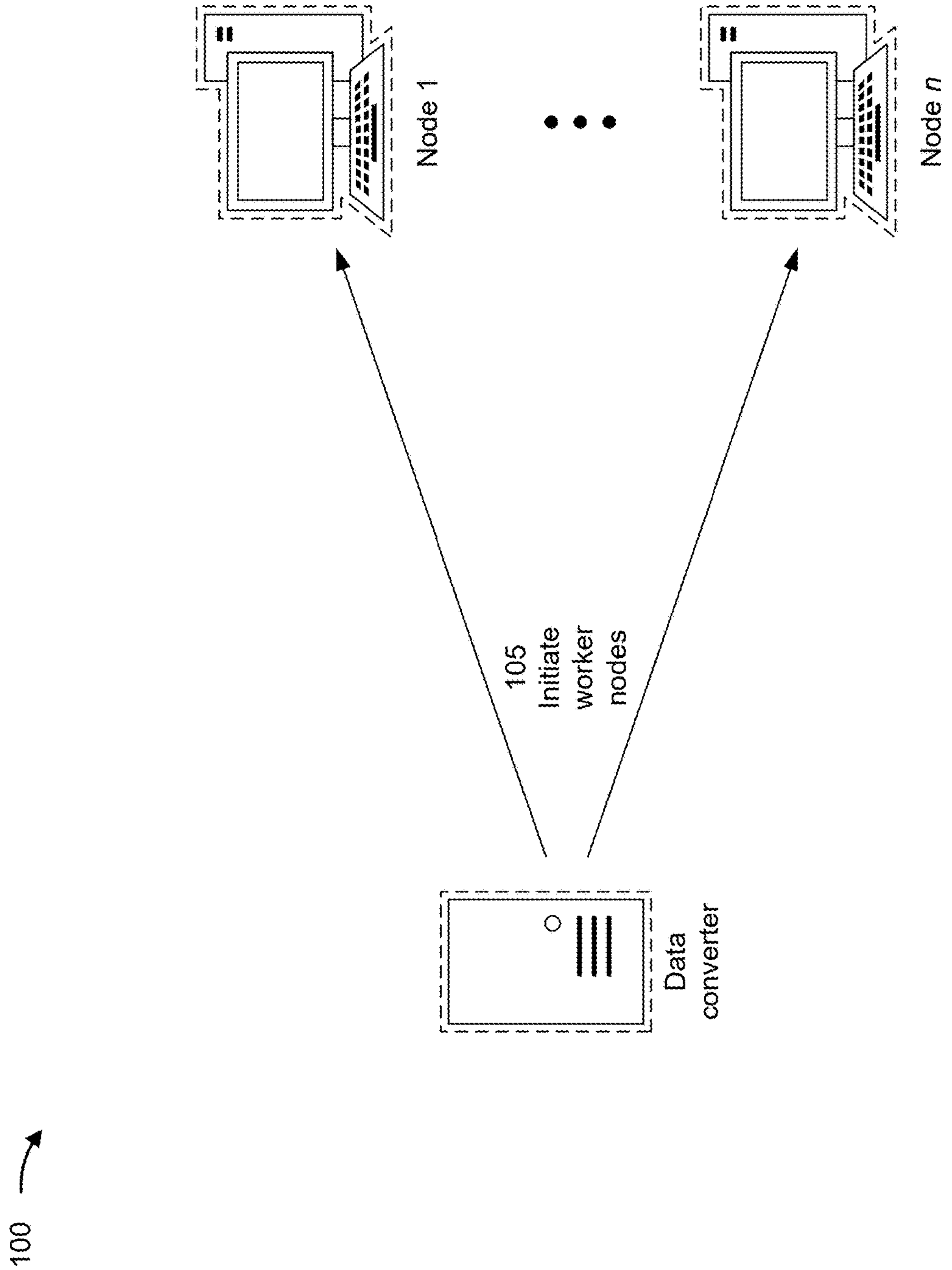
FIGS. 1A-1H are diagrams of an example implementation relating to converting a data stream into files, in accordance with some embodiments of the present disclosure.

As shown in FIG. 1A and by reference number 105, the data converter may initiate a plurality of worker nodes. For example, the data converter may initiate n nodes, where n represents an integer greater than 1 (e.g., greater than or equal to 2). Therefore, in FIGS. 1A-1E, "Node 1" through "Node n" are used to label the plurality of worker nodes. The worker nodes may comprise Amazon® Elastic Container Service (ECS) tasks or Microsoft Azure® Container Apps jobs, among other examples.

In some implementations, the plurality of worker nodes may be associated with a plurality of partitions (of a data stream). The worker nodes and the partitions may correspond on a one-to-one basis. For example, each worker node (in the plurality of worker nodes) may correspond to a unique partition in the plurality of partitions. Additionally, or alternatively, the worker nodes and the partitions may correspond on a one-to-many basis. For example, each worker node (in the plurality of worker nodes) may be associated with two or more partitions in the plurality of partitions. The quantity of partitions (in the plurality of partitions) may be preconfigured. For example, the data converter may be configured to use a set number of partitions (e.g., ten partitions or fifty partitions, among other examples), whether a default number or a custom number (e.g., indicated by an administrator device, described elsewhere herein).

The data converter may initiate the plurality of worker nodes using an event service, such as Amazon EventBridge or Microsoft® Event Grid, among other examples. Therefore, the data converter may transmit a plurality of commands (e.g., hypertext transfer protocol (HTTP) messages, file transfer protocol (FTP) messages, and/or application programming interface (API) calls) to the event service in order to initiate the plurality of worker nodes. As described in connection with FIG. 4, the data converter may use (at least a portion of) the same hardware resources as are used by the plurality of worker nodes. Alternatively, the data converter may be separate from a cloud computing system (or another set of hardware and software resources) that supports the plurality of worker nodes.

In some implementations, the data converter may initiate the plurality of worker nodes automatically. For example, the data converter may initiate the plurality of worker nodes periodically (e.g., according to a schedule, whether a default schedule or a custom schedule, such as one indicated by an administrator device). Additionally, or alternatively, the data converter may initiate the plurality of worker nodes on demand. For example, the data converter may receive a request (e.g., from an administrator device) that triggers the data converter to initiate the plurality of worker nodes.

The plurality of worker nodes may be executed at least partially in parallel. Therefore, two or more partitions, in the plurality of partitions, may be processed concurrently. As a result, latency is reduced for processing the data stream.

Figure 1B:
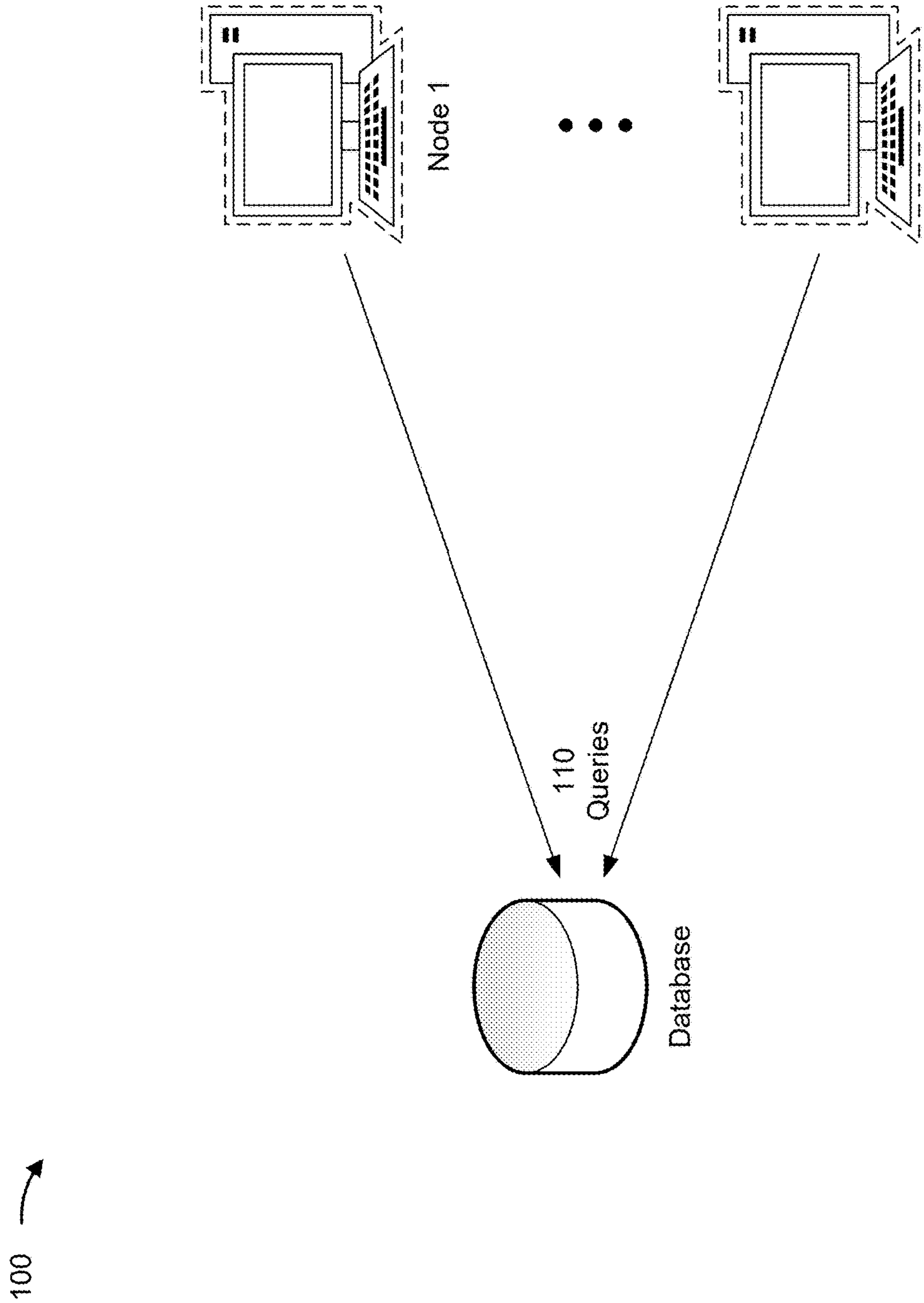

As shown in FIG. 1B and by reference number 110, each worker node may query the database. For example, the data converter may transmit (for the worker node), and the database may receive, the query. The database may store the data stream (that is split into the plurality of partitions and is to be converted to files). The data stream may be associated with a set of objects, such as vehicles and/or other objects. Each object may be stored in association with a corresponding identifier (e.g., a vehicle identification number (VIN) and/or another type of alphanumeric identifier). The data stream may encode a sequence of events for the set of objects. For example, an event may include a removal of an object from the set, an addition of an object to the set, or a modification to an object in the set.

Each query may be a structured query language (SQL) query (e.g., processed by Presto or another type of query engine) or a NoSQL query. Each query may include an indication of the data stream (e.g., a name and/or another type of alphanumeric identifier), for example, in a header of the query or as an argument, among other examples. The indication of the data stream may be preconfigured (whether a default indication or a custom indication, such as one provided by an administrator device). Alternatively, the indication of the data stream may be received in a request (e.g., from an administrator device) that triggers the data converter to convert the data stream to files.

In some implementations, the data converter may determine, for each partition, a key. For example, each event in the data stream may be stored in association with a key out of a plurality of possible keys. For an event, the key may comprise a hash of an identifier associated with an object to which the event relates. For example, for an event associated with a vehicle in a set of vehicles, the key may comprise a hash of a VIN associated with the vehicle. As a result, all events associated with a same object may be assigned to a same key and thus a same partition. Additionally, the key may comprise a modulus of (or may otherwise be regularized by) the quantity of partitions. As a result, the plurality of possible keys may correspond (e.g., on a one-to-one basis) to the plurality of partitions. The data converter may thus transmit, for each worker node, a request to the database that includes a key for a partition corresponding to the worker node.

Figure 1C:
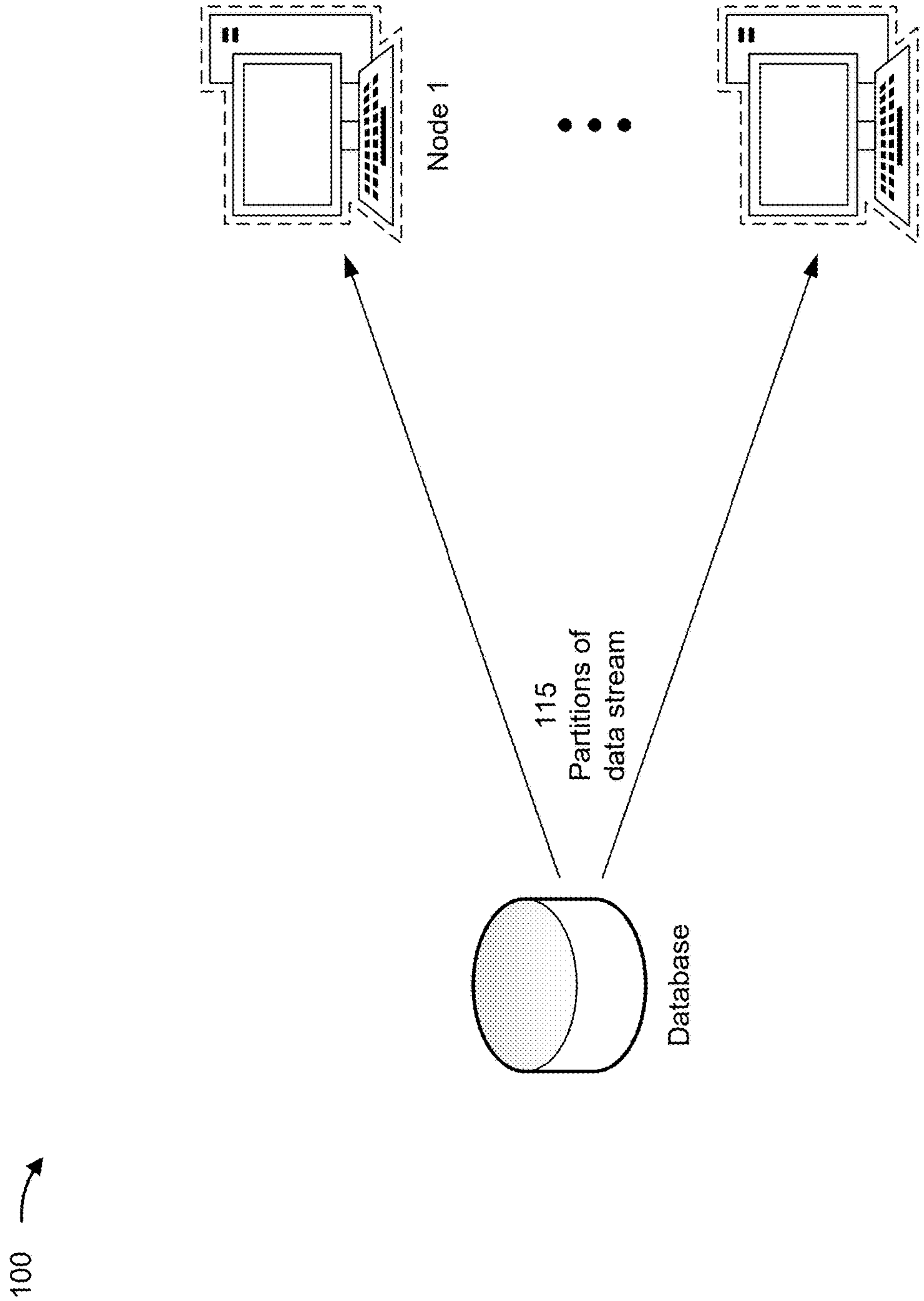

As shown in FIG. 1C and by reference number 115, each worker node may receive a portion of the data stream. For example, the database may transmit, and the data converter may receive (at the worker node), the portion of the data stream. The portion of the data stream may be included in a response to the query (transmitted by the worker node). In some implementations, the portion of the data stream may be associated with one or more partitions, in the plurality of partitions, that correspond to the worker node. Alternatively, the portion of the data stream may be associated with a unique partition, in the plurality of partitions, that corresponds to the worker node.

Figure 1D:
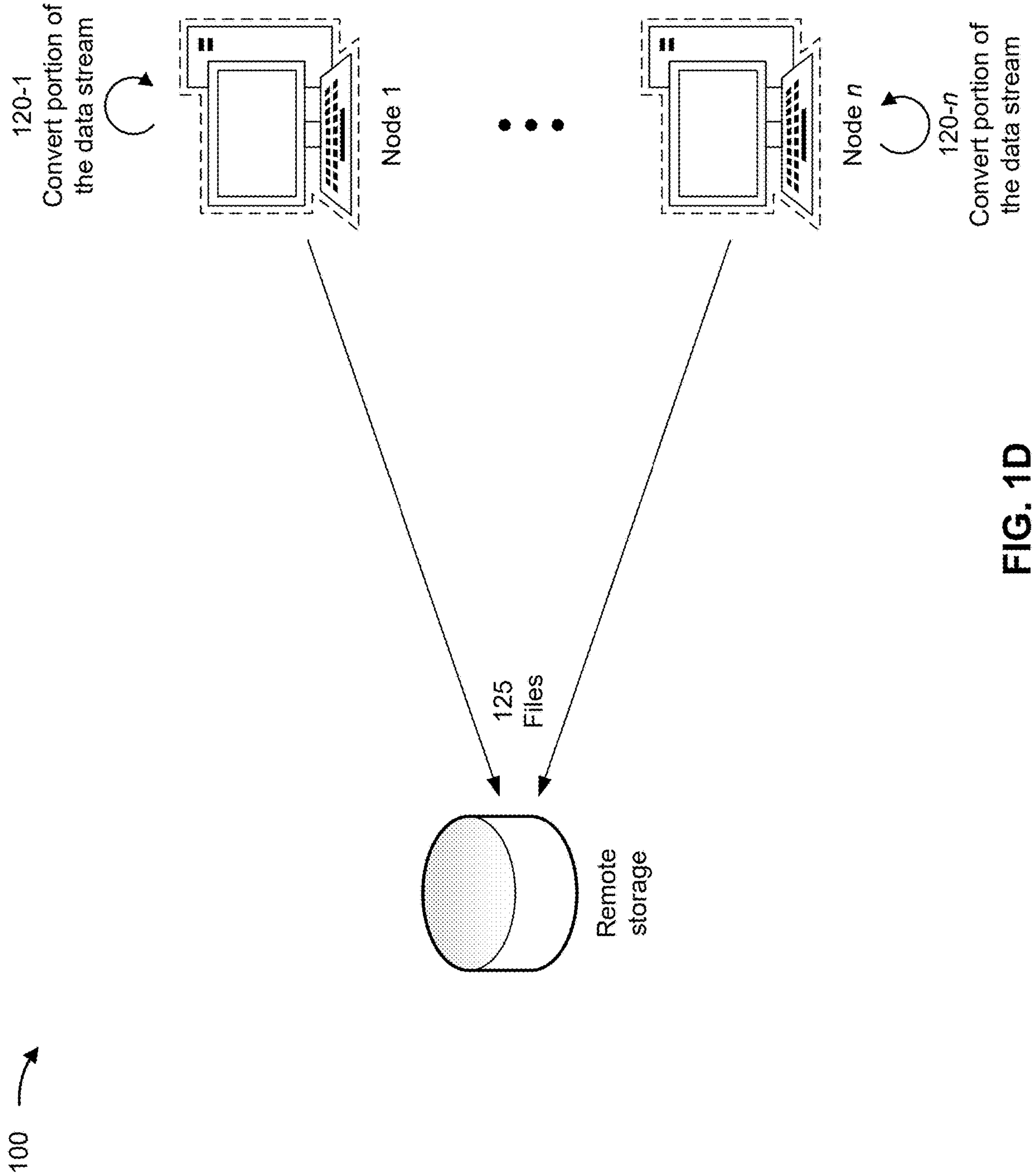

As shown in FIG. 1D, the data stream may be converted into legacy format versions. For example, as shown by reference numbers 120-1 through **120-*n***, each worker node may convert the portion of the data stream (received at the worker node) into a legacy format version. In some implementations, the legacy format version may be a TSV file, a CSV file, and/or another type of DSV file. Additionally, or alternatively, the legacy format version may be another type of structured data file, whether a relational structure or a graph structure.

In some implementations, each worker node may standardize formatting of fields (e.g., at least one field) in the portion of the data stream. For example, the worker node may convert letters in a field to all capitals (or all lowercase). In another example, the worker node may convert numbers across fields to a same basis (e.g., decimal, binary, or hexadecimal, among other examples). Additionally, or alternatively, each worker node may remove or replace characters (e.g., at least one character), in the portion of the data stream, that are incompatible. For example, when the legacy format version is a TSV file, the worker node may remove extra spaces (e.g., leading spaces and/or trailing spaces in events of the portion of the data stream). In another example, when the legacy format version is a CSV file, the worker node may remove commas (e.g., in events of the portion of the data stream).

In some implementations, the plurality of worker nodes may execute in delta mode. As used herein, "delta mode" refers to a mode in which all events in the data stream (within a recent time window) are converted to legacy format versions. In some cases, a delta mode may also be referred to as a differential run. Alternatively, the plurality of worker nodes may execute in full mode. As used herein, "full mode" refers to a mode in which a most recent event, for each object in the data stream, is converted to a legacy format version. Therefore, the data converter may, for each worker node, filter events in the portion of the data stream by newest event. Additionally, or alternatively, the data converter may, for each worker node, discard removal events in the portion of the data stream. For example, the data processor may infer that an object has been removed by absence of the object from the legacy format versions, rather than by presence of a removal event associated with the object. In some cases, a full mode may also be referred to as a complete run.

As shown by reference number 125, each worker node may upload a corresponding file, encoding the legacy format version of the portion of the data stream, to the remote storage. For example, the data converter may transmit (for the plurality of worker nodes), and the remote storage may receive, a plurality of files, where each file in the plurality of files encodes a portion of the legacy format versions (of the data stream). The remote storage may store the plurality of files (and provide access to the plurality of files for the data processor, as described below). Each file, in the plurality of files, may encode a unique partition, in the plurality of partitions, of the data stream. Accordingly, in some implementations, each worker node may generate a single file in the plurality of files (e.g., when each worker node corresponds to a single partition). Additionally, or alternatively, each worker node may generate two or more files in the plurality of files (e.g., when each worker node corresponds to two or more partitions).

Figure 1E:
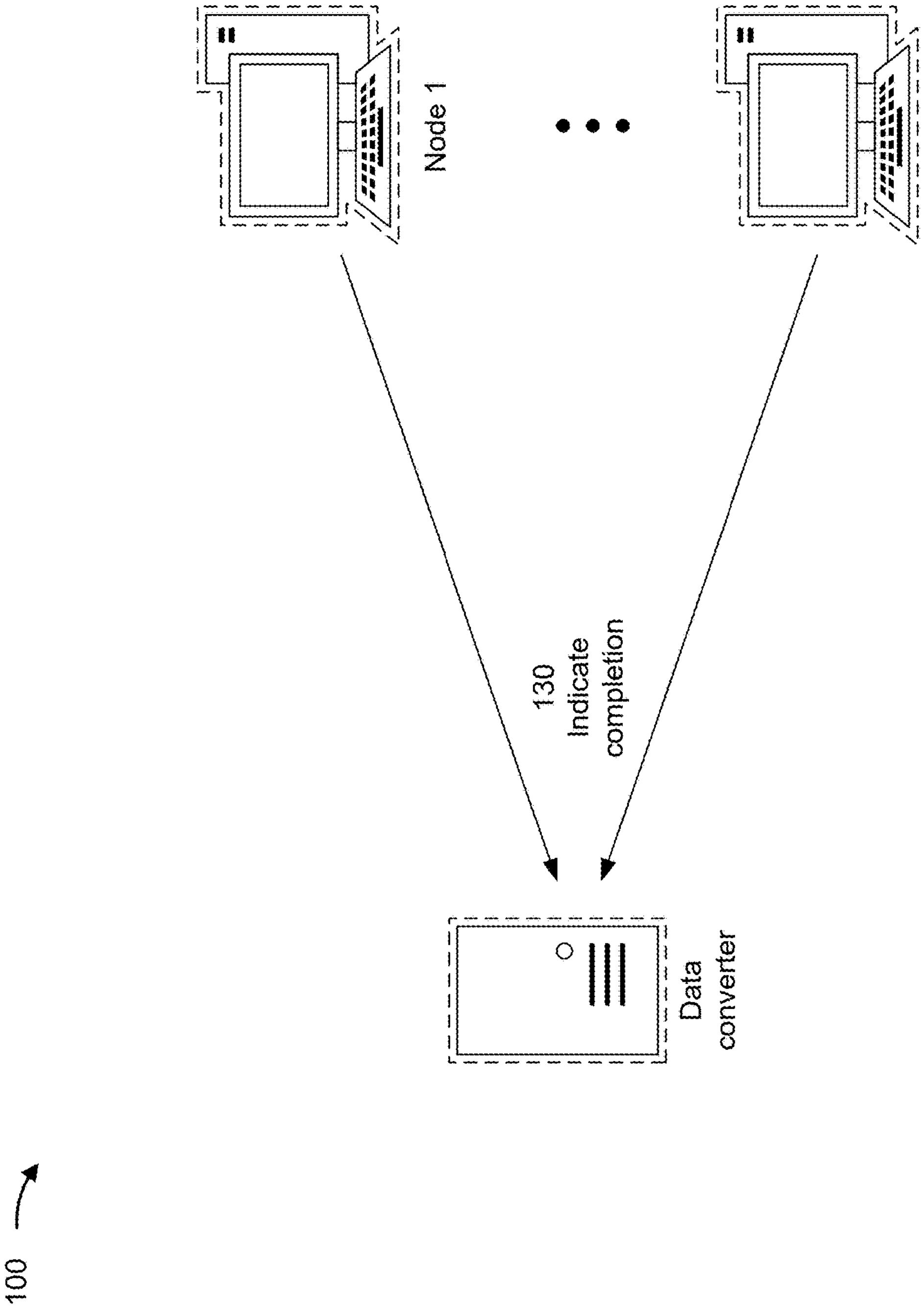

As shown in FIG. 1E and by reference number 130, each worker node may indicate completion to the data converter. For example, for each worker node, the data converter may receive an indication of completion from the event service (e.g., Amazon EventBridge or Microsoft Event Grid, among other examples) in response to the worker node completing execution (e.g., in response to completion of an Amazon ECS task or a Microsoft Azure Container Apps job, among other examples, comprising the worker node). The data converter may receive an indication of completion from a worker node in response to upload of the file (e.g., to the remote storage) generated by the worker node.

Figure 1F:
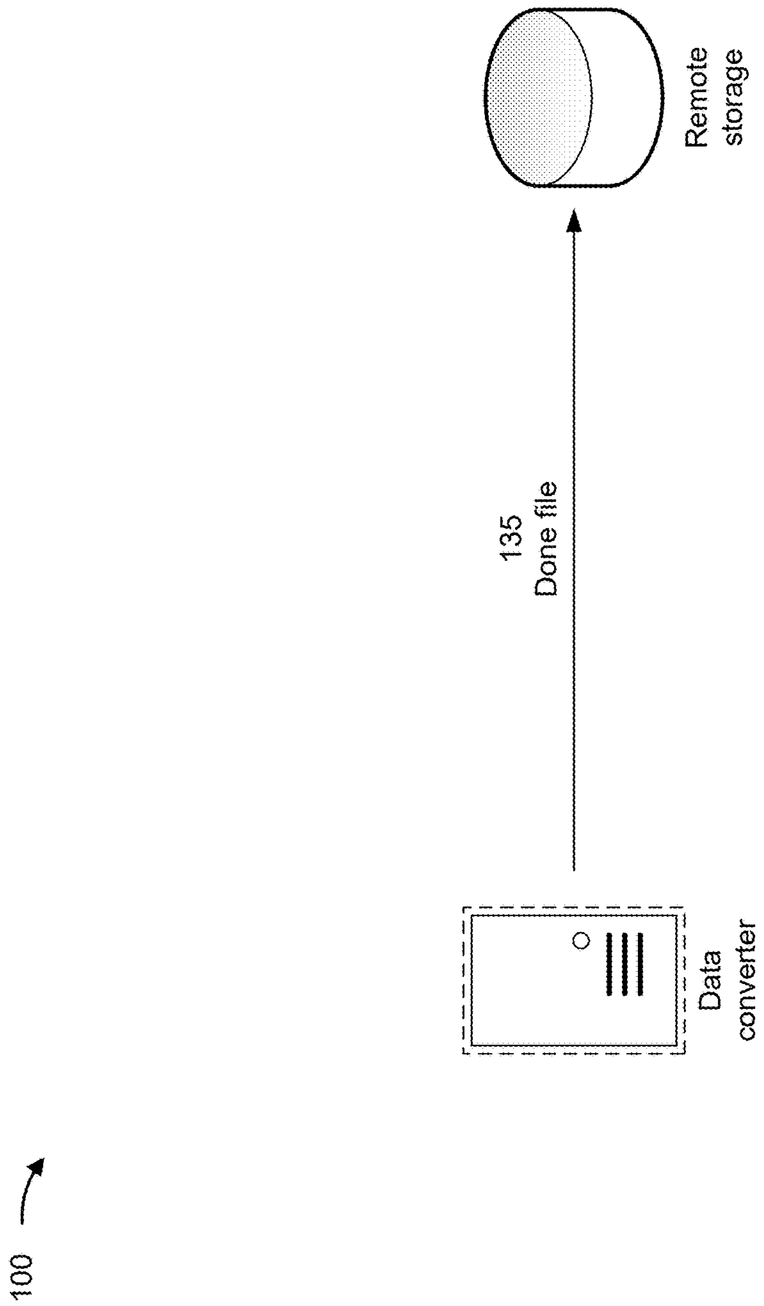

As shown in FIG. 1F and by reference number 135, the data converter may upload a done file to the remote storage. For example, the data converter may transmit, and the remote storage may receive, the done file in response to indications of completion from the plurality of worker nodes. Accordingly, the data converter may upload the done file to the remote storage based on (the plurality of worker nodes) uploading the plurality of files to the remote storage. A "done file" may refer to any file that indicates, through a filename of the file and/or content of the file, that a task is completed.

In some implementations, the data converter may encode, in the done file, an indication of a delta run or a full run, as described above. Additionally, or alternatively, the data converter may indicate, in the done file, a quantity of files (in the plurality of files). Additionally, or alternatively, the data converter may indicate, in the done file, a quantity of partitions (in the plurality of partitions). Additionally, or alternatively, the data converter may encode, in the done file, a list of corresponding files (in the plurality of files) uploaded from the plurality of worker nodes. The list may include filenames and/or file paths associated with the plurality of files.

Figure 1G:
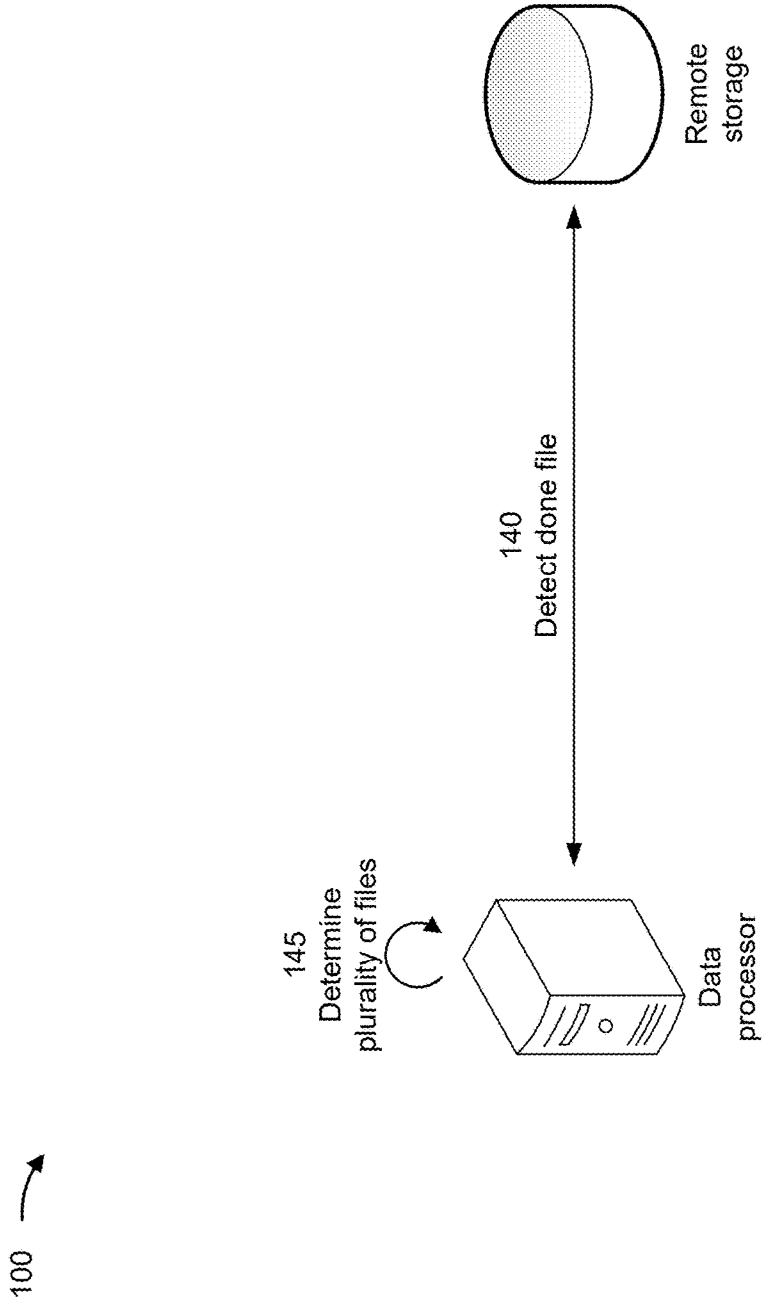

As shown in FIG. 1G and by reference number 140, the data processor may detect the done file in the remote storage. For example, periodically, the data processor may transmit, and the remote storage may receive, a request for new files in the remote storage. Accordingly, the remote storage may transmit, and the data processor may receive, a response to the request, and the data processor may detect the done file based on the response. Additionally, or alternatively, the remote storage may "push" a notification of the done file to the data processor rather than the data processor performing a "pull" to check for the done file. For example, the remote storage may transmit, and the data processor may receive, an indication of any new files, whether periodically and/or on demand (e.g., upon generation of a new file, such as the done file).

As shown by reference number 145, the data processor may determine the plurality of files based on the done file. For example, the data processor may extract a plurality of filenames, corresponding to the plurality of files, from the done file. Additionally, or alternatively, the data processor may extract information associated with the plurality of files (e.g., an indication of a delta run or a full run, a quantity of files (in the plurality of files), and/or a quantity of partitions (in the plurality of partitions), as described above) from the done file. Accordingly, the data processor may determine the plurality of files based on the information. For example, the data processor may generate a plurality of filenames, corresponding to the plurality of files, from the information.

Figure 1H:
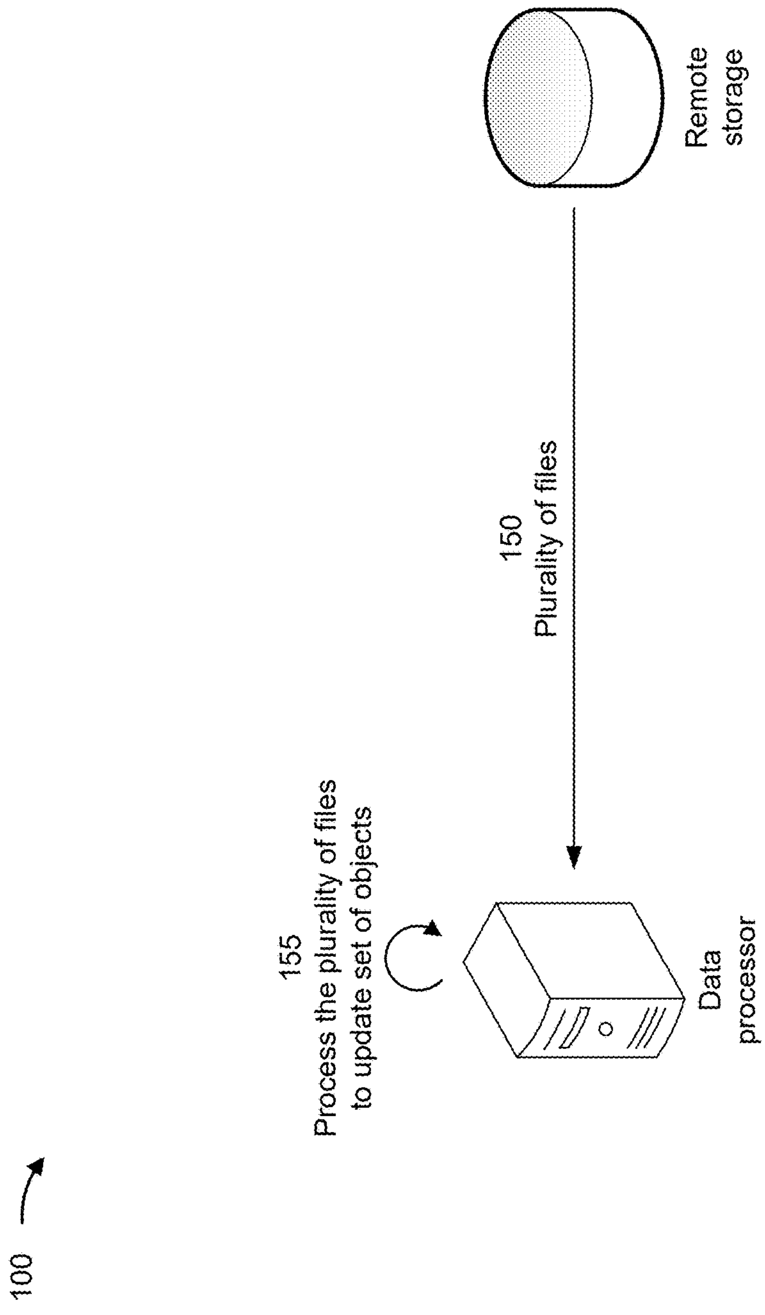

As shown in FIG. 1H and by reference number 150, the remote storage may transmit, and the data processor may receive, the plurality of files. For example, the data processor may transmit, and the remote storage may receive, a request (e.g., one or more requests) for the plurality of files in the remote storage. Accordingly, the remote storage may transmit, and the data processor may receive, the plurality of files in response to the request.

As shown by reference number 155, the data processor may process the plurality of files, in sequence, to update a set of objects. For example, the data processor may maintain the set of objects that are associated with the data stream. Therefore, the data processor may form a node in a distributed database for the set of objects. As described above, the plurality of files may encode a set of events corresponding to new objects in the set of objects and updates to existing objects in the set of objects. Therefore, the data processor may add objects to the set and/or perform updates to existing objects in the set based on the plurality of files. In some implementations, the data processor may further remove existing objects from the set based on the existing objects being absent from the plurality of files (e.g., based on the plurality of files being associated with a full run) or based on removal events encoded in the plurality of files (e.g., based on the plurality of files being associated with a delta run). In some implementations, each object, in the set of objects, may be associated with an event (e.g., at least one event) in the plurality of files. Alternatively, some objects (e.g., at least one object), in the set of objects, may be unassociated with an event (e.g., any event) in the plurality of files.

By using techniques as described in connection with FIGS. 1A-1H, the data converter converts the data stream into the plurality of files. As a result, the data processor, which may still rely on files to maintain the set of objects, can still receive updates. As a result, a distributed database of the set of objects is more accurate because the data processor is able to update its copy of the distributed database.

As indicated above, FIGS. 1A-1H are provided as an example. Other examples may differ from what is described with regard to FIGS. 1A-1H.

FIGS. 2A-2D are diagrams of an example 200 associated with error detection while converting a data stream into files. As shown in FIGS. 2A-2D, example 200 includes a data converter, a remote storage, and an administrator device. These devices are described in more detail in connection with FIGS. 4 and 5.

Figure 2A:
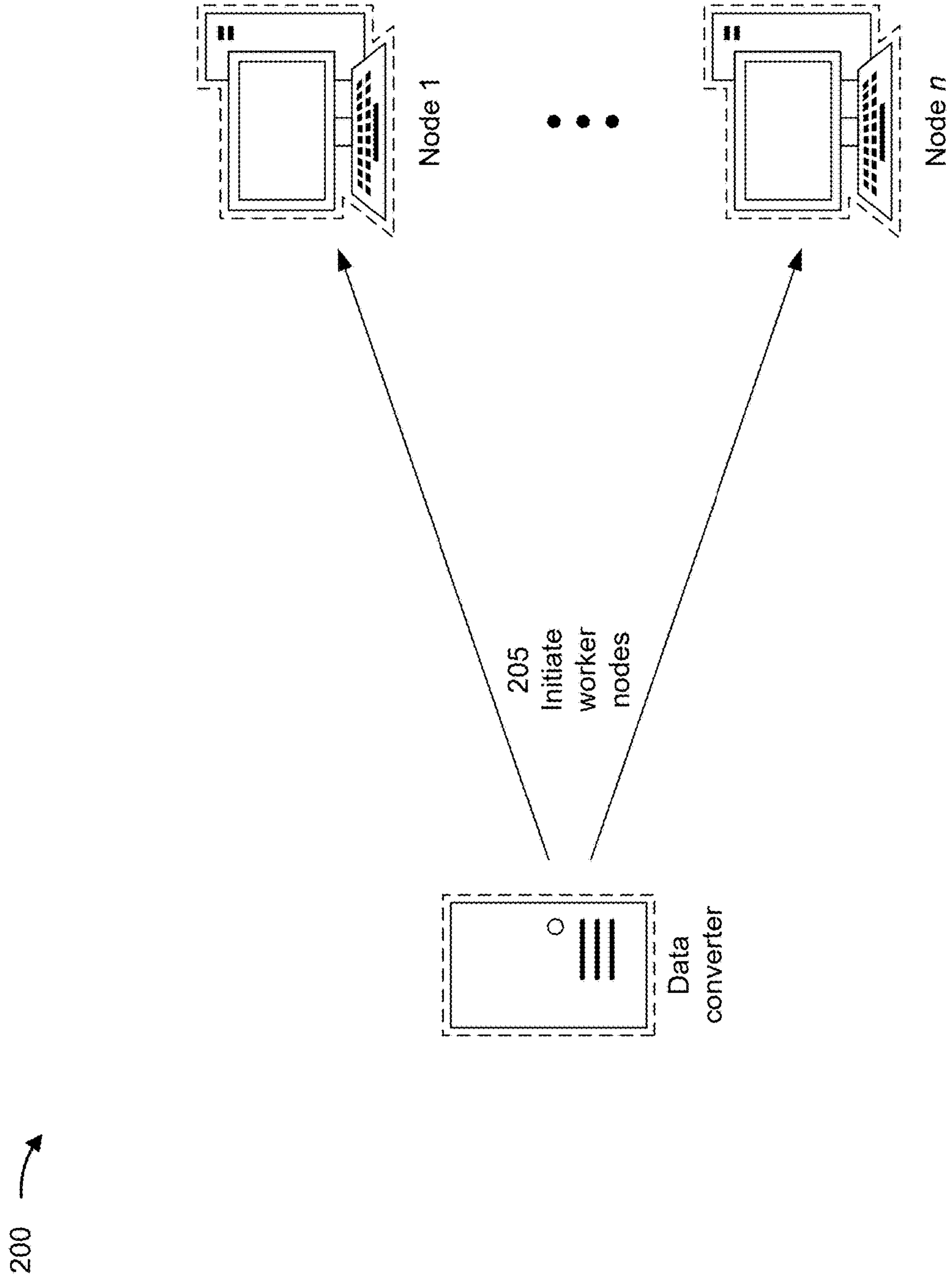
FIGS. 2A-2D are diagrams of an example implementation relating to error detection while converting a data stream into files, in accordance with some embodiments of the present disclosure.

In the example 200, the data converter may initiate conversion of a data stream into a plurality of files. Therefore, as shown in FIG. 2A and by reference number 205, the data converter may initiate a plurality of worker nodes. The data converter may initiate n worker nodes, as described in connection with reference number 105 of FIG. 1A.

Figure 2B:
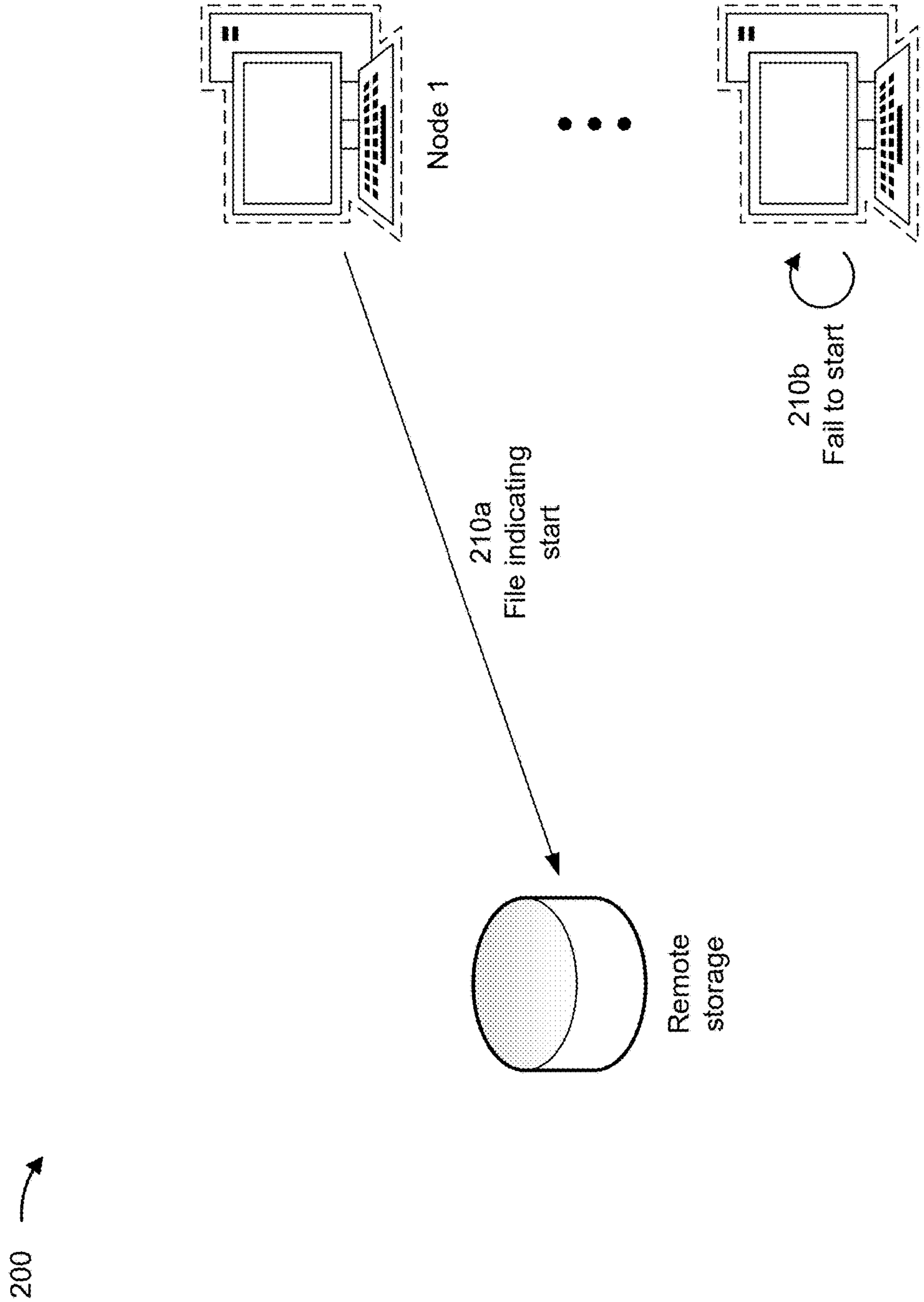

Each worker node may, before querying a database (e.g., as described in connection with FIG. 1B), upload a file indicating a start of the worker node. For example, as shown in FIG. 2B and by reference number 210*a*, a first worker node may upload a file indicating a start of the first worker node to the remote storage. The file may be referred to as a "partStart" file. The file may include information about the first worker node or may be an empty file whose presence indicates that the first worker node has begun execution.

Some worker nodes, however, may fail to initiate. For example, as shown by reference number 210*b*, a second worker node may fail to start. Because the second worker node has not begun execution, no file indicating a start of the second worker node has been uploaded to the remote storage.

Figure 2C:
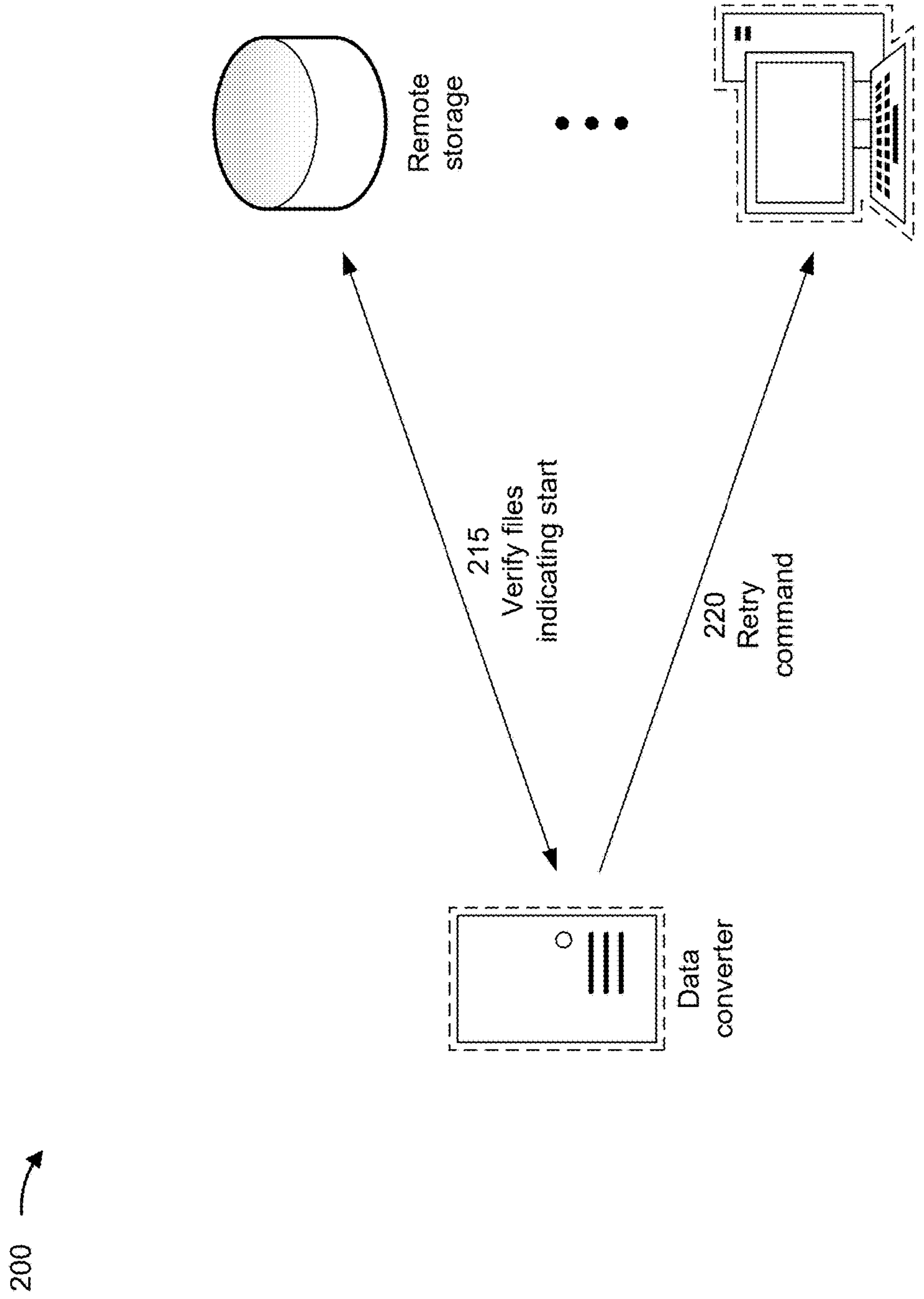

As shown in FIG. 2C and by reference number 215, the data converter may verify a plurality of files indicating starts of the plurality of worker nodes. Accordingly, the data converter may verify that each worker node has been initiated based on a file indicating a start of the worker node. In some implementations, the data processor may transmit, and the remote storage may receive, a request for partStart files (e.g., in response to initiating the plurality of worker nodes and/or expiry of a timer after initiating the plurality of worker nodes). Accordingly, the remote storage may transmit, and the data processor may receive, any partStart files in response to the request, and the data processor may verify whether each worker node has been initiated based on the partStart files. Additionally, or alternatively, the remote storage may "push" a notification of any partStart files to the data processor rather than the data processor performing a "pull" to check for the partStart files. For example, the remote storage may transmit, and the data processor may receive, an indication of any new files, whether periodically and/or on demand (e.g., upon generation of a new file, such as the done file).

Generally, the data converter may remove the partStart files whenever worker nodes are finished. For example, the data converter may remove, for each worker node and after uploading a corresponding file (e.g., encoding a legacy format version of a portion of the data stream for the worker node), the file indicating the start of the worker node from the remote storage. Therefore, memory overhead is reduced at the remote storage because the partStart files are not retained after the data stream is successfully converted to legacy format versions.

The data converter may attempt to re-start any failed worker nodes. For example, as shown by reference number 220, the data converter may transmit a retry command to the second worker node based on absence of a files indicating start of the second worker node in the remote storage.

In some implementations, the data converter may utilize idempotency of the legacy format versions to further increase resiliency. For example, the data converter may attempt multiple re-starts of any failed worker nodes because any duplicated partition jobs will result in a same legacy format version and done file. Additionally, or alternatively, the data converter may be configured to initially attempt multiple starts of each worker node in order to improve resiliency.

Figure 2D:
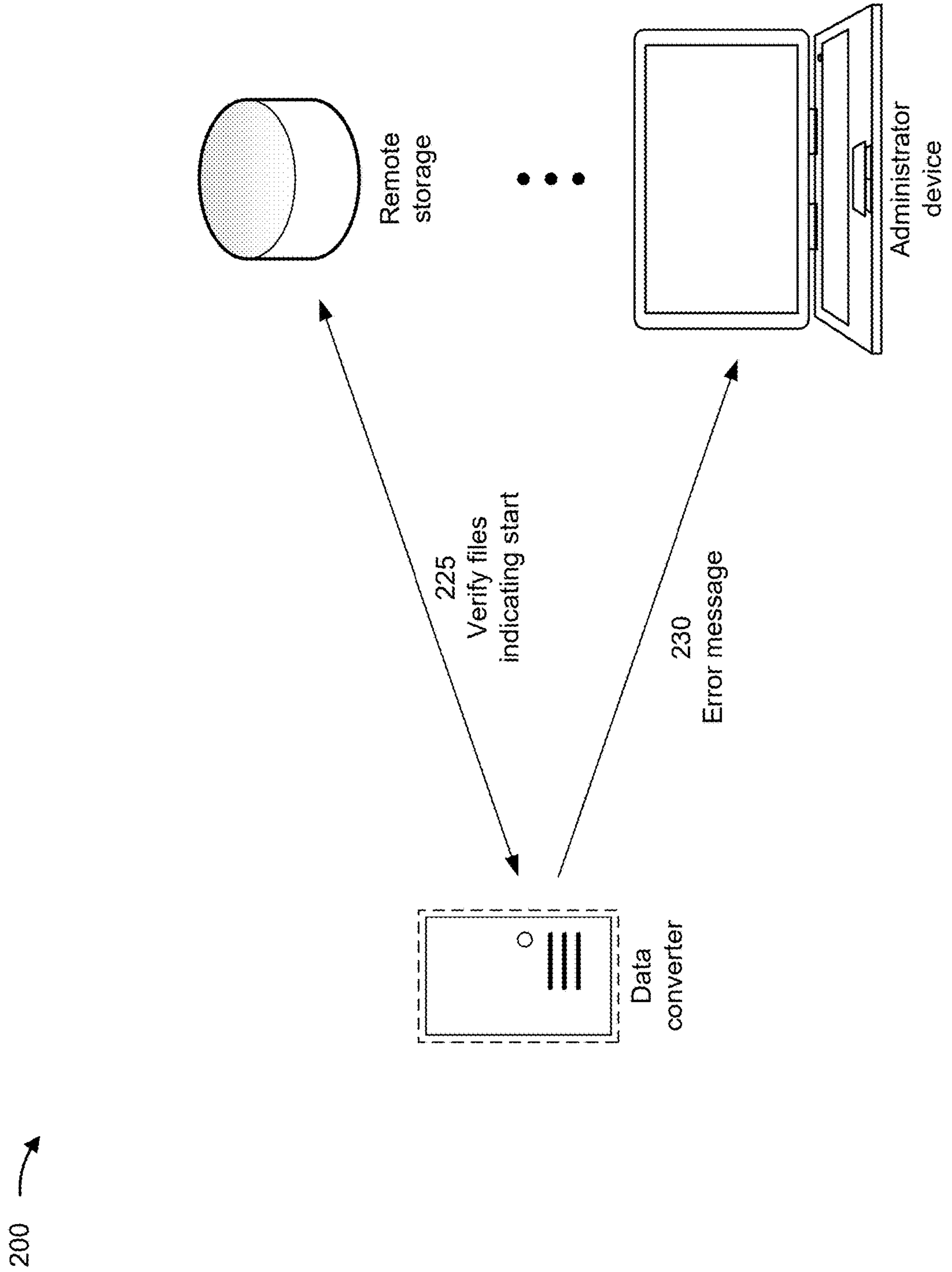

In some cases, the second worker node may initiate and upload a partStart file to the remote storage. Alternatively, the second worker node may continue to fail. For example, as shown in FIG. 2D and by reference number 225, the data converter may again attempt to verify that the second worker node has been initiated based on a file indicating a start of the second worker node and may again determine that the second worker node has failed to initiate. Accordingly, as shown by reference number 230, the data converter may transmit, and the administrator device may receive, an error message. The administrator device may be associated with an administrator, and the data converter may transmit the error message to the administrator device based on the administrator device being associated with the administrator. The data converter may determine, using a data structure mapping (i.e., that maps) data stream identifiers to user identifiers, the corresponding administrator associated with the data stream. For example, the data converter may map a string representing the data stream (e.g., a name of the data stream) to a string representing the corresponding administrator (e.g., a name of the administrator, a username, and/or an email address, among other examples). Additionally, the data converter may halt execution of remaining worker nodes (e.g., by transmitting halt commands to the remaining worker nodes). Alternatively, the administrator may (e.g., using the administrator device) manually trigger initiation of the second worker node. Therefore, the manual initiation of the second worker node may, along with continued execution of the remaining worker nodes by the data converter, may result in a finished job (e.g., the plurality of files described in connection with FIG. 1D).

Although the example 200 is shown in connection with two attempts to start the second worker node, other examples may include additional attempts. For example, a fail threshold may be set to two, three, four, or a greater integer. Therefore, when a fail counter associated with a same worker node (and incremented by the data converter each time the data converter determines that the same worker node has failed to initiate) satisfies the fail threshold, the data converter may transmit the error message.

By using techniques as described in connection with FIGS. 2A-2D, the data converter may identify errors in initiating worker nodes sooner and thus decrease latency between the errors and correction of the errors (e.g., by the administrator). As a result, power and processing resources are conserved that otherwise would have been wasted on an incomplete conversion of the data stream.

As indicated above, FIGS. 2A-2D are provided as an example. Other examples may differ from what is described with regard to FIGS. 2A-2D.

Figure 3A:
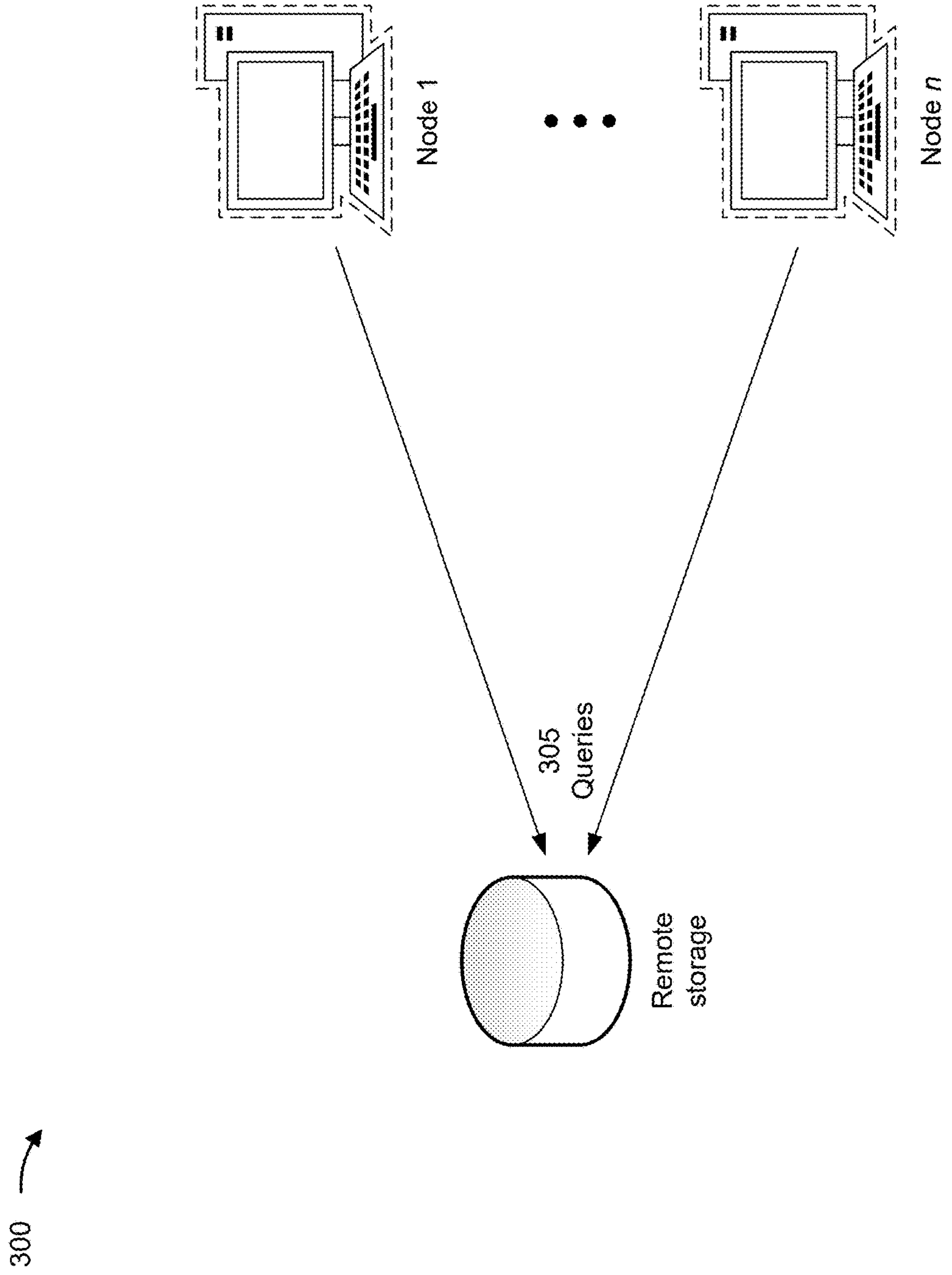
FIGS. 3A-3C are diagrams of an example implementation relating to error detection while converting a data stream into files, in accordance with some embodiments of the present disclosure.
Figure 3B:
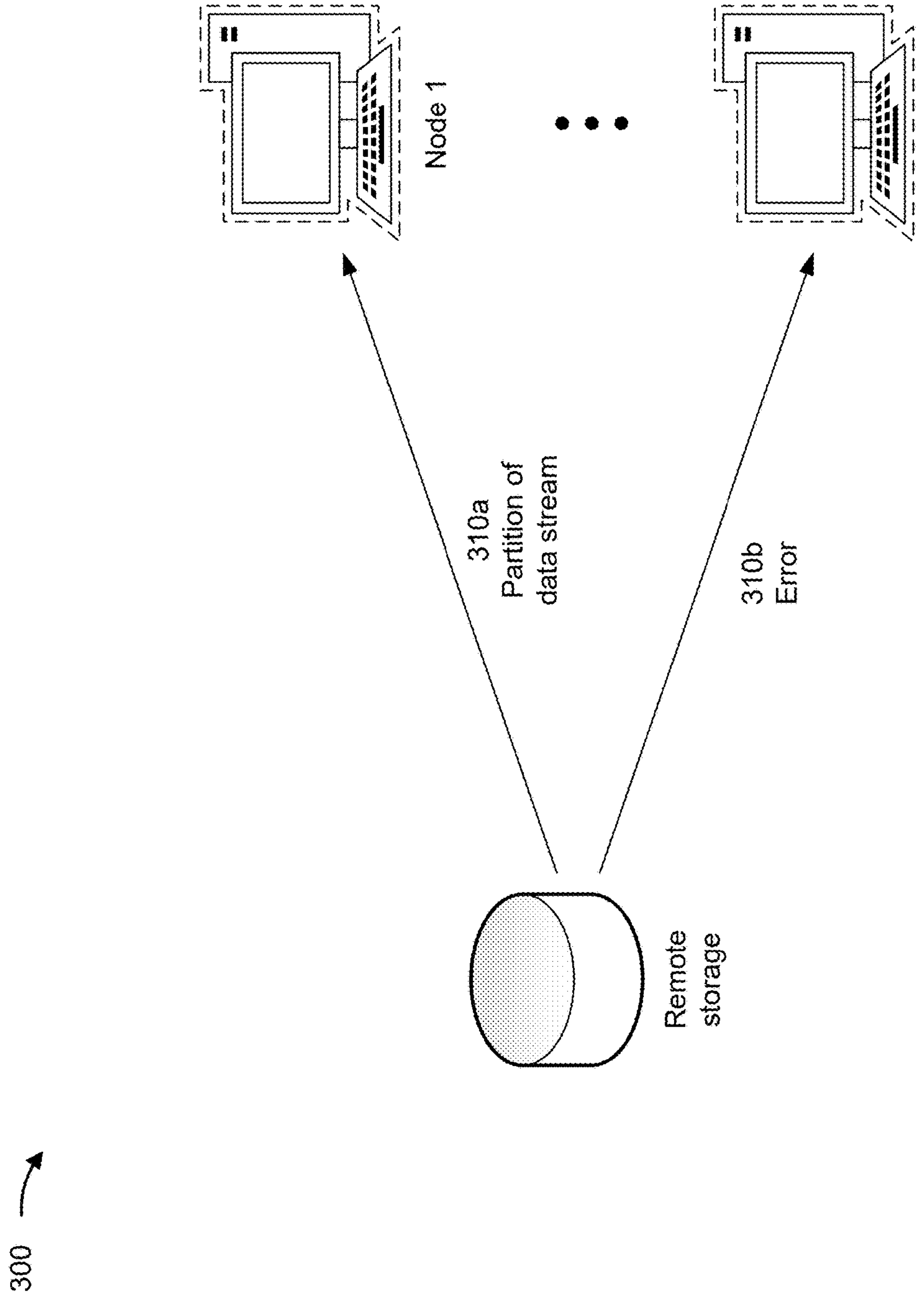
Figure 3C:
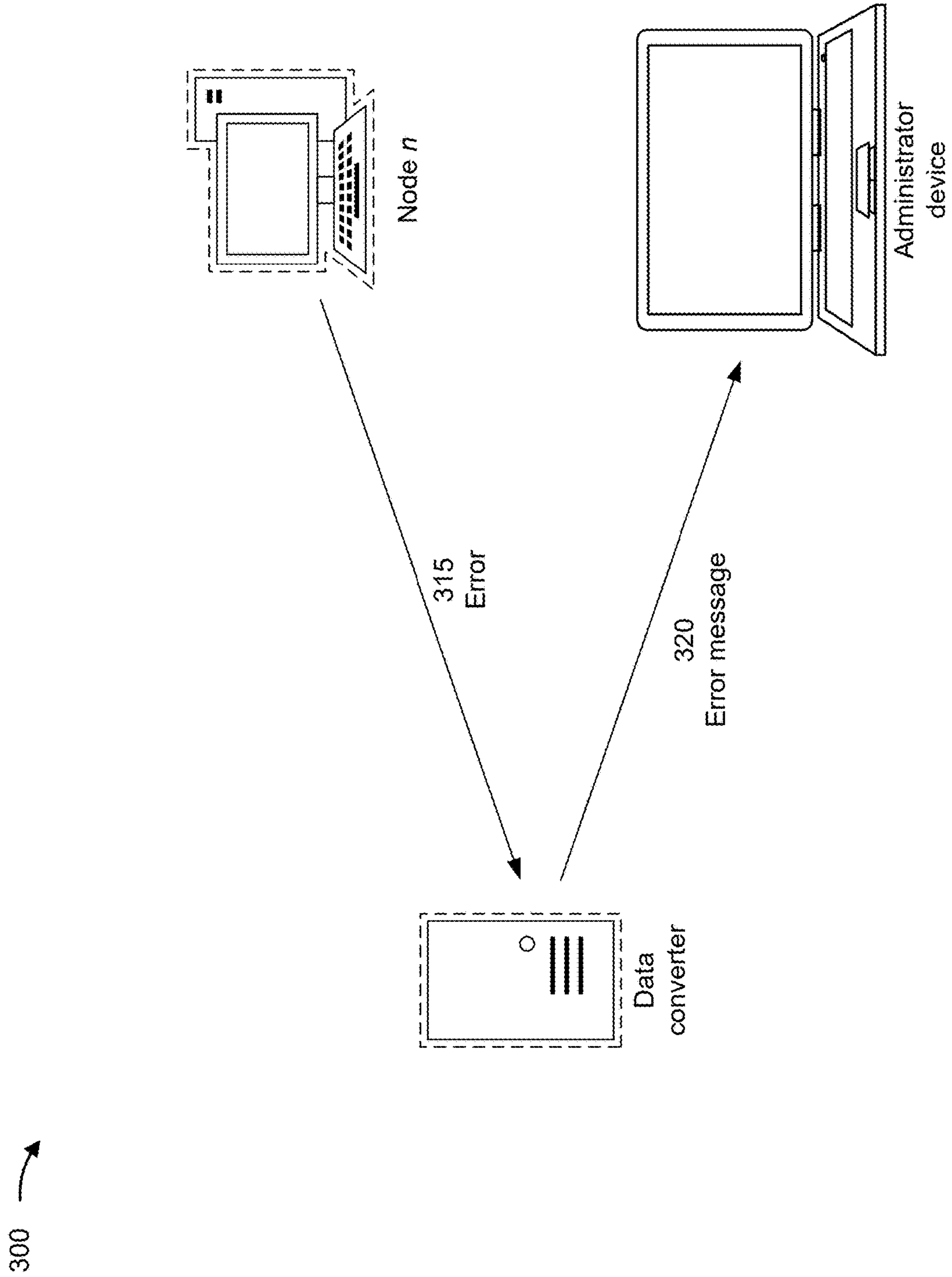

FIGS. 3A-3C are diagrams of an example 300 associated with error detection while converting a data stream into files. As shown in FIGS. 3A-3C, example 300 includes a data converter, a remote storage, and an administrator device. These devices are described in more detail in connection with FIGS. 4 and 5.

In the example 300, the data converter may initiate a plurality of worker nodes to converter a data stream into a plurality of files. Therefore, as shown in FIG. 3A and by reference number 305, each worker node may query the database. For example, the data converter may transmit (for the worker node), and the database may receive, the query, as described in connection with reference number 110 of FIG. 1B.

Each worker node may receive a portion of the data stream (corresponding to a partition, in a plurality of partitions, of the data stream). For example, as shown in FIG. 3B and by reference number 310*a*, a first worker node may receive a first partition of the data stream from the database.

Some queries, however, may fail to execute. For example, as shown by reference number 310*b*, a second worker node may fail to receive a second partition of the data stream from the database. For example, the database may transmit an error indicator to the second worker node.

The data converter may attempt to re-execute any failed queries. For example, the second worker node may re-transmit the query to the database. In some implementations, a fail threshold may be set to two, three, four, or a greater integer. Therefore, when a fail counter associated with the second worker node (and incremented by the second worker node each time the database fails to respond to the query) satisfies the fail threshold, the second worker node may transmit an indication of an error, as described below in connection with FIG. 3C.

In some implementations, the data converter may utilize idempotency of the legacy format versions to further increase resiliency. For example, the data converter may be configured to instantiate multiple instances of each worker node, each of which may independently attempt to query the database, in order to improve resiliency.

As shown in FIG. 3C and by reference number 315, the second worker node may transmit, and the data converter may receive, an indication of an error (e.g., failing to receive the second partition of the data stream from the database). The indication of the error may be the same error indicator received from the database and/or an additional indication generated by the second worker node. Accordingly, as shown by reference number 320, the data converter may transmit, and the administrator device may receive, an error message. The administrator device may be associated with an administrator, and the data converter may transmit the error message to the administrator device based on the administrator device being associated with the administrator. The data converter may determine, using a data structure mapping (i.e., that maps) data stream identifiers to user identifiers, the corresponding administrator associated with the data stream. For example, the data converter may map a string representing the data stream (e.g., a name of the data stream) to a string representing the corresponding administrator (e.g., a name of the administrator, a username, and/or an email address, among other examples). Additionally, the data converter may halt execution of remaining worker nodes (e.g., by transmitting halt commands to the remaining worker nodes). Alternatively, the administrator may (e.g., using the administrator device) manually trigger initiation of the second worker node. Therefore, the manual initiation of the second worker node may, along with continued execution of the remaining worker nodes by the data converter, may result in a finished job (e.g., the plurality of files described in connection with FIG. 1D).

By using techniques as described in connection with FIGS. 3A-3C, the data converter may identify errors in querying the database sooner and thus decrease latency between the errors and correction of the errors (e.g., by the administrator). As a result, power and processing resources are conserved that otherwise would have been wasted on an incomplete conversion of the data stream.

As indicated above, FIGS. 3A-3C are provided as an example. Other examples may differ from what is described with regard to FIGS. 3A-3C.

Figure 4:
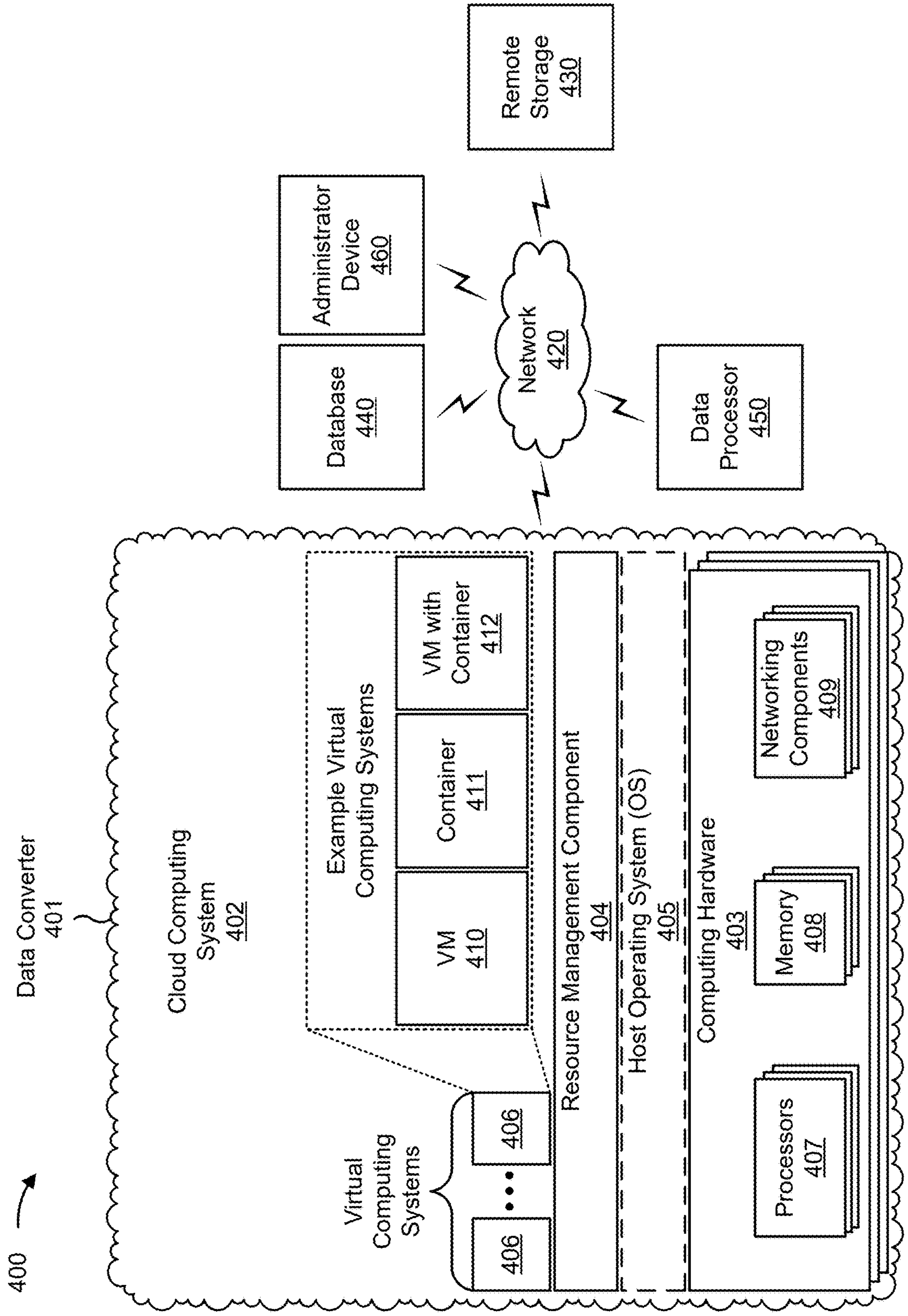
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include a data converter 401, which may include one or more elements of and/or may execute within a cloud computing system 402. The cloud computing system 402 may include one or more elements 403-412, as described in more detail below. As further shown in FIG. 4, environment 400 may include a network 420, a remote storage 430, a database 440, a data processor 450, and/or an administrator device 460. Devices and/or elements of environment 400 may interconnect via wired connections and/or wireless connections.

The cloud computing system 402 may include computing hardware 403, a resource management component 404, a host operating system (OS) 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

The computing hardware 403 may include hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, and/or one or more networking components 409. Examples of a processor, a memory, and a networking component (e.g., a communication component) are described elsewhere herein.

The resource management component 404 may include a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines 410. Additionally, or alternatively, the resource management component 404 may include a container manager, such as when the virtual computing systems 406 are containers 411. In some implementations, the resource management component 404 executes within and/or in coordination with a host operating system 405.

A virtual computing system 406 may include a virtual environment that enables cloud-based execution of operations and/or processes described herein using computing hardware 403. As shown, a virtual computing system 406 may include a virtual machine 410, a container 411, or a hybrid environment 412 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the data converter 401 may include one or more elements 403-412 of the cloud computing system 402, may execute within the cloud computing system 402, and/or may be hosted within the cloud computing system 402, in some implementations, the data converter 401 may not be cloud-based (e.g., may be implemented outside of a cloud computing system) or may be partially cloud-based. For example, the data converter 401 may include one or more devices that are not part of the cloud computing system 402, such as device 500 of FIG. 5, which may include a standalone server or another type of computing device. The data converter 401 may perform one or more operations and/or processes described in more detail elsewhere herein.

The network 420 may include one or more wired and/or wireless networks. For example, the network 420 may include a cellular network, a public land mobile network (PLMN), a local area network (LAN), a wide area network (WAN), a private network, the Internet, and/or a combination of these or other types of networks. The network 420 enables communication among the devices of the environment 400.

The remote storage 430 may include one or more devices capable of receiving, generating, storing, processing, and/or providing information associated with files, as described elsewhere herein. The remote storage may include a communication device and/or a computing device. For example, the remote storage 430 may include a server, a database server, an application server, a client server, a web server, a host server, a proxy server, a virtual server (e.g., executing on computing hardware), a server in a cloud computing system, a device that includes computing hardware used in a cloud computing environment, or a similar type of device. The remote storage 430 may be a portion of a larger storage system, such as such as Amazon Simple Storage Service (S3), Google® Cloud Storage, or Microsoft Azure, among other examples. The remote storage 430 may communicate with one or more other devices of environment 400, as described elsewhere herein.

The database 440 may be implemented on one or more devices capable of receiving, generating, storing, processing, and/or providing information associated with data streams, as described elsewhere herein. The database 440 may be implemented on a communication device and/or a computing device. For example, the database 440 may be implemented on a server, a database server, an application server, a client server, a web server, a host server, a proxy server, a virtual server (e.g., executing on computing hardware), a server in a cloud computing system, a device that includes computing hardware used in a cloud computing environment, or a similar type of device. The database 440 may be implemented using Data Lake on Amazon Web Services® (AWS®) or Microsoft OneLake®, among other examples. The database 440 may communicate with one or more other devices of environment 400, as described elsewhere herein.

The data processor 450 may include one or more devices capable of receiving, generating, storing, processing, providing, and/or routing information associated with object sets, as described elsewhere herein. The data processor 450 may include a communication device and/or a computing device. For example, the data processor 450 may include a server, such as an application server, a client server, a web server, a database server, a host server, a proxy server, a virtual server (e.g., executing on computing hardware), or a server in a cloud computing system. In some implementations, the data processor 450 may include computing hardware used in a cloud computing environment. The data processor 450 may communicate with one or more other devices of environment 400, as described elsewhere herein.

The administrator device 460 may include one or more devices capable of receiving, generating, storing, processing, and/or providing information associated with error messages, as described elsewhere herein. The administrator device 460 may include a communication device and/or a computing device. For example, the administrator device 460 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The administrator device 460 may communicate with one or more other devices of environment 400, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the environment 400 may perform one or more functions described as being performed by another set of devices of the environment 400.

Figure 5:
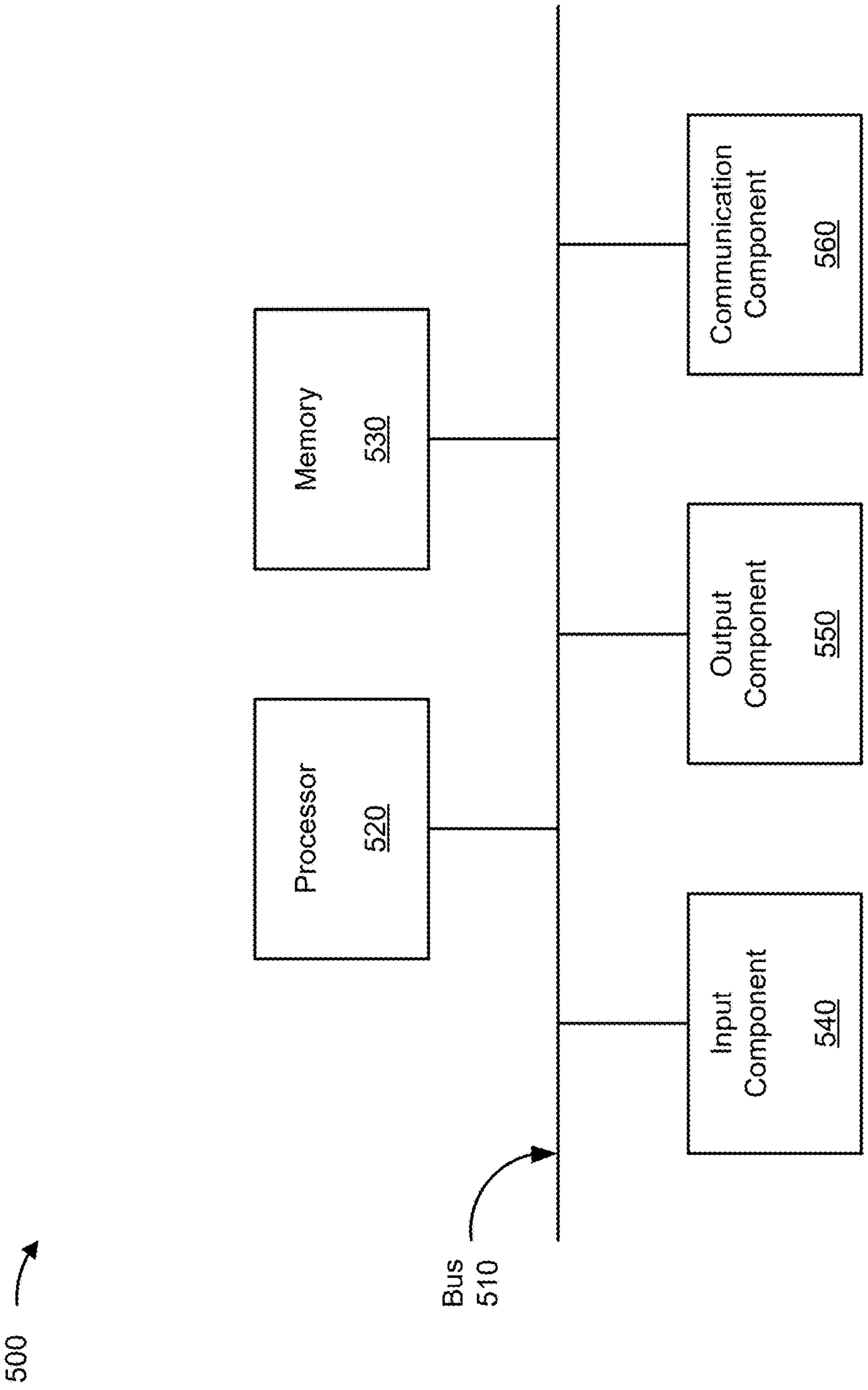
FIG. 5 is a diagram of example components of one or more devices of FIG. 4, in accordance with some embodiments of the present disclosure.

FIG. 5 is a diagram of example components of a device 500 associated with converting a data stream into files. The device 500 may correspond to a remote storage 430, a device implementing a database 440, a data processor 450, and/or an administrator device 460. In some implementations, a remote storage 430, a device implementing a database 440, a data processor 450, and/or an administrator device 460 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
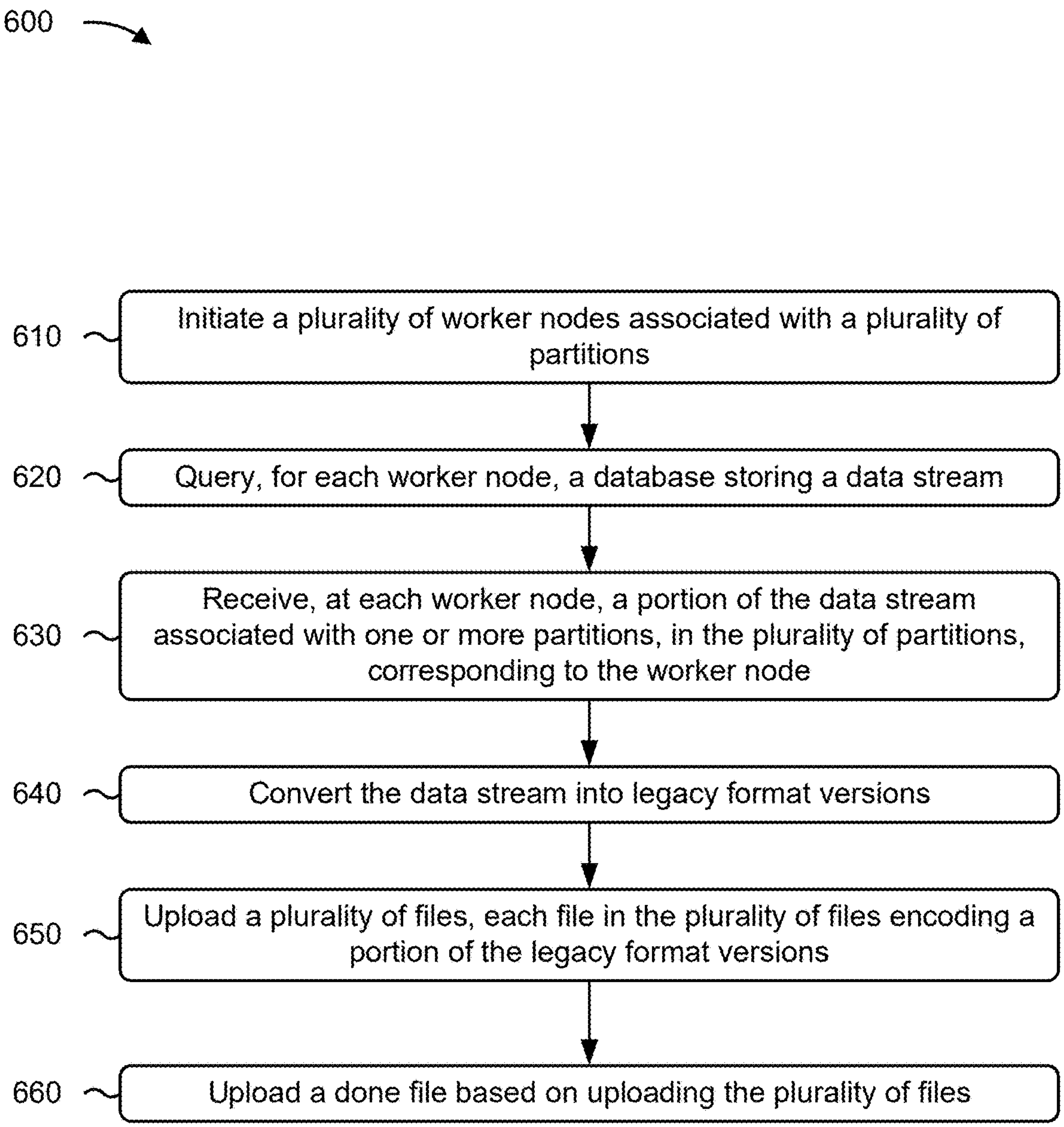
FIG. 6 is a flowchart of an example process relating to converting a data stream into files, in accordance with some embodiments of the present disclosure.

FIG. 6 is a flowchart of an example process 600 associated with converting a data stream into files. In some implementations, one or more process blocks of FIG. 6 may be performed by a data converter 401. In some implementations, one or more process blocks of FIG. 6 may be performed by another device or a group of devices separate from or including the data converter 401, such as a remote storage 430, a device implementing a database 440, a data processor 450, and/or an administrator device 460. Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include initiating a plurality of worker nodes associated with a plurality of partitions (block 610). For example, the data converter 401 (e.g., using processor 520, memory 530, and/or communication component 560) may initiate a plurality of worker nodes associated with a plurality of partitions, as described above in connection with reference number 105 of FIG. 1A. As an example, the data converter 401 may initiate the plurality of worker nodes using an event service, such as Amazon EventBridge or Microsoft Event Grid, among other examples. Therefore, the data converter 401 may transmit a plurality of commands (e.g., HTTP messages, FTP messages, and/or API calls) to the event service in order to initiate the plurality of worker nodes.

As further shown in FIG. 6, process 600 may include querying, for each worker node, a database storing the data stream (block 620). For example, the data converter 401 (e.g., using processor 520, memory 530, and/or communication component 560) may query, for each worker node, a database storing the data stream, as described above in connection with reference number 110 of FIG. 1B. As an example, the data converter 401 may, for each worker node, transmit a query that is a SQL query (e.g., processed by Presto or another type of query engine) or a NoSQL query.

As further shown in FIG. 6, process 600 may include receiving, at each worker node, a portion of the data stream associated with one or more partitions, in the plurality of partitions, corresponding to the worker node (block 630). For example, the data converter 401 (e.g., using processor 520, memory 530, and/or communication component 560) may receive, at each worker node, a portion of the data stream associated with one or more partitions, in the plurality of partitions, corresponding to the worker node, as described above in connection with reference number 115 of FIG. 1C. As an example, the data converter 401 may receive, at each worker node, the portion of the data stream in a response to the query transmitted by the worker node. In some implementations, the portion of the data stream may be associated with a unique partition, in the plurality of partitions, that corresponds to the worker node.

As further shown in FIG. 6, process 600 may include converting the data stream into legacy format versions (block 640). For example, the data converter 401 (e.g., using processor 520 and/or memory 530) may convert the data stream into legacy format versions, as described above in connection with reference numbers 120-1 through 120-*n* of FIG. 1D. As an example, each worker node may standardize formatting of at least one field in the portion of the data stream. Additionally, or alternatively, each worker node may remove or replace at least one character, in the portion of the data stream, that is incompatible.

As further shown in FIG. 6, process 600 may include uploading a plurality of files, each file in the plurality of files encoding a portion of the legacy format versions (block 650). For example, the data converter 401 (e.g., using processor 520, memory 530, and/or communication component 560) may upload the plurality of files, each file in the plurality of files encoding a portion of the legacy format versions, as described above in connection with reference number 125 of FIG. 1D. As an example, each worker node may upload a corresponding file, in the plurality of files, encoding the portion of the legacy format versions of the data stream.

As further shown in FIG. 6, process 600 may include uploading a done file based on uploading the plurality of files (block 660). For example, the data converter 401 (e.g., using processor 520, memory 530, and/or communication component 560) may upload a done file based on uploading the plurality of files, as described above in connection with reference number 135 of FIG. 1F. As an example, the data converter 401 may upload the done file based on (the plurality of worker nodes) uploading the plurality of files.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1H, FIGS. 2A-2D, and/or FIGS. 3A-3C. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

Figure 7:
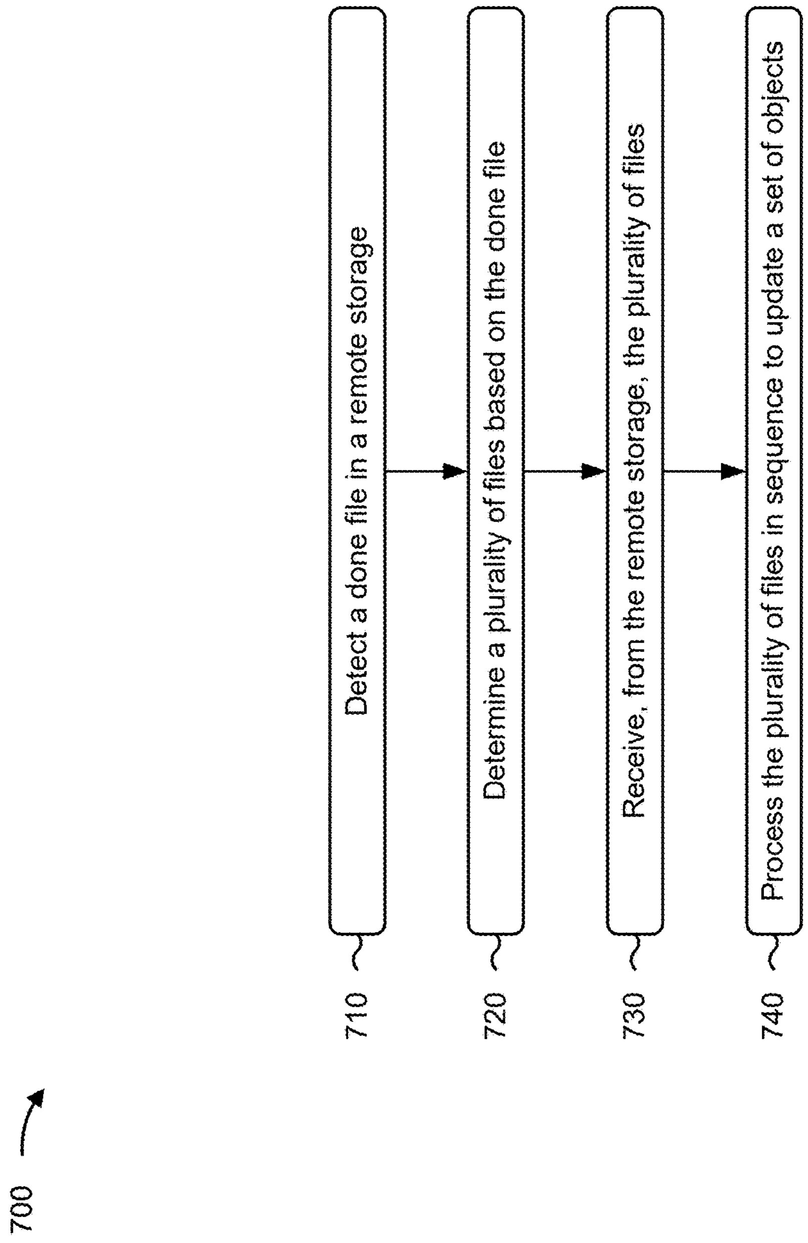
FIG. 7 is a flowchart of an example process relating to processing files converted from a data stream, in accordance with some embodiments of the present disclosure.

FIG. 7 is a flowchart of an example process 700 associated with processing files converted from a data stream. In some implementations, one or more process blocks of FIG. 7 may be performed by a data processor 450. In some implementations, one or more process blocks of FIG. 7 may be performed by another device or a group of devices separate from or including the data processor 450, such as a data converter 401, a remote storage 430, a device implementing a database 440, and/or an administrator device 460. Additionally, or alternatively, one or more process blocks of FIG. 7 may be performed by one or more components of the device 500, such as processor 520, memory 530, input component 540, output component 550, and/or communication component 560.

As shown in FIG. 7, process 700 may include detecting a done file in a remote storage (block 710). For example, the data processor 450 (e.g., using processor 520, memory 530, and/or communication component 560) may detect a done file in a remote storage, as described above in connection with reference number 140 of FIG. 1G. As an example, the remote storage may "push" a notification of the done file to the data processor 450. Additionally, or alternatively, the data processor 450 may perform a "pull" to check for the done file.

As further shown in FIG. 7, process 700 may include determining a plurality of files based on the done file (block 720). For example, the data processor 450 (e.g., using processor 520 and/or memory 530) may determine the plurality of files based on the done file, as described above in connection with reference number 145 of FIG. 1G. As an example, the data processor 450 may extract a plurality of filenames, corresponding to the plurality of files, from the done file. Additionally, or alternatively, the data processor 450 may generate a plurality of filenames, corresponding to the plurality of files, from information included in the done file.

As further shown in FIG. 7, process 700 may include receiving, from the remote storage, the plurality of files (block 730). For example, the data processor 450 (e.g., using processor 520, memory 530, and/or communication component 560) may receive, from the remote storage, the plurality of files, as described above in connection with reference number 150 of FIG. 1H. As an example, the data processor 450 may transmit, to the remote storage, one or more requests for the plurality of files. Accordingly, the data processor 450 may receive, from the remote storage, the plurality of files in response to the one or more requests.

As further shown in FIG. 7, process 700 may include processing the plurality of files in sequence to update a set of objects (block 740). For example, the data processor 450 (e.g., using processor 520 and/or memory 530) may process the plurality of files in sequence to update a set of objects, as described above in connection with reference number 155 of FIG. 1H. As an example, the data processor 450 may maintain the set of objects that are associated with the data stream. Therefore, the data processor 450 may add new objects to the set, perform updates to existing objects in the set, and/or remove existing objects from the set, based on the plurality of files.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel. The process 700 is an example of one process that may be performed by one or more devices described herein. These one or more devices may perform one or more other processes based on operations described herein, such as the operations described in connection with FIGS. 1A-1H. Moreover, while the process 700 has been described in relation to the devices and components of the preceding figures, the process 700 can be performed using alternative, additional, or fewer devices and/or components. Thus, the process 700 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for converting a data stream into a plurality of files, the system comprising:
- one or more memories; and
- one or more hardware processors, communicatively coupled to the one or more memories, configured to:
  - initiate a plurality of worker nodes supported by a cloud computing system, wherein a worker node in the plurality of worker nodes is associated with a unique partition in a plurality of partitions,
    - wherein a key is determined for a partition of the plurality of partitions,
    - wherein the key comprises a hash that is determined for an event in the data stream based on an identifier associated with an object related to the event, and
    - wherein a plurality of events, including the event, associated with a same object is assigned to a same key and a same partition;
  - verify that the worker node has been initiated based on a file received indicating a start of the worker node, wherein the file is removed when the worker node finishes a job;
  - query, by the one or more hardware processors, and based on transmitting a request that includes the key, a database storing the data stream;
  - receive, by the one or more hardware processors, a portion of the data stream associated with the unique partition corresponding to the worker node;
  - convert, by the one or more hardware processors, the portion of the data stream into a legacy format version;
  - encode, by the one or more hardware processors, the legacy format version of the portion of the data stream;
  - upload, by the one or more hardware processors, a corresponding file, out of the plurality of files, that corresponds to encoded data from encoding the legacy format version of the portion of the data stream; and
  - upload a done file based on uploading the plurality of files.

2. The system of claim 1, wherein the plurality of worker nodes are executed at least partially in parallel.

3. The system of claim 1, wherein the one or more hardware processors, to query the database, are configured to:
- determine, for the unique partition corresponding to the worker node, a key; and
- transmit, to the database, a request including the key.

4. The system of claim 1, wherein each corresponding file comprises a delimiter-separated values (DSV) file.

5. The system of claim 1, wherein the one or more hardware processors, to convert the portion of the data stream into the legacy format version, are configured to:

standardize formatting of at least one field in the portion of the data stream; and remove or replace characters, in the portion of the data stream, that are incompatible.

6. The system of claim 1, wherein the one or more hardware processors, to convert the portion of the data stream into the legacy format version, are configured to:

filter events in the portion of the data stream by newest event; and discard removal events in the portion of the data stream.

7. The system of claim 1, wherein the one or more hardware processors, to convert the portion of the data stream into the legacy format version, are configured to:

filter events in the portion of the data stream by newest event.

8. A method of processing a plurality of files from a data stream, comprising:

initiating, by a device, a plurality of worker nodes supported by a cloud computing system, wherein a worker node in the plurality of worker nodes is associated with a unique partition in a plurality of partitions, wherein a key is determined for a partition of the plurality of partitions, wherein the key comprises a hash that is determined for an event in the data stream based on an identifier associated with an object related to the event, and wherein a plurality of events, including the event, associated with a same object is assigned to a same key and a same partition;

verifying, by the device, that the worker node has been initiated based on a file received indicating a start of the worker node;

querying, by the device, and based on transmitting a request that includes the key, a database storing the data stream;

receiving, by the device, a portion of the data stream associated with the unique partition corresponding to the worker node;

converting, by the device, the portion of the data stream into a legacy format version;

encoding, by the device, the legacy format version of the portion of the data stream;

uploading, by the device, a corresponding file, out of the plurality of files, that corresponds to encoded data from encoding the legacy format version of the portion of the data stream;

uploading, by the device, a done file based on the plurality of worker nodes uploading the plurality of files;

detecting, by the device, the done file in a remote storage;

determining, by the device, the plurality of files based on the done file;

receiving, by the device, the plurality of files; and processing, by the device, the plurality of files in sequence to update a set of objects.

9. The method of claim 8, wherein the done file encodes an indication of a delta run or a full run.

10. The method of claim 8, wherein the done file encodes a quantity of files in the plurality of files.

11. The method of claim 8, wherein determining the plurality of files comprises:

extracting a plurality of filenames, corresponding to the plurality of files, from the done file.

12. The method of claim 8, wherein each object, in the set of objects, is associated with at least one event in the plurality of files.

13. The method of claim 8, wherein the plurality of files encode a set of events corresponding to new objects in the set of objects and updates to existing objects in the set of objects.

14. A non-transitory computer-readable medium storing a set of instructions for converting a data stream into a plurality of files, the set of instructions comprising:

one or more instructions that, when executed by one or more processors of a device, cause the device to:

initiate a plurality of worker nodes supported by a cloud computing system and associated with a plurality of partitions, wherein a key is determined for a partition of the plurality of partitions, wherein the key comprises a hash that is determined for an event in the data stream based on an identifier associated with an object related to the event, wherein a plurality of events, including the event, associated with a same object is assigned to a same key and a same partition, and wherein a worker node of the plurality of work nodes is associated with a partition in the plurality of partitions;

query a database storing the data stream;

receive a portion of the data stream associated with one or more partitions, in the plurality of partitions, corresponding to the worker node;

convert the data stream into legacy format versions;

encode a portion of the legacy format versions;

upload the plurality of files, wherein each file in the plurality of files corresponds to encoded data from encoding the portion of the legacy format versions; and upload a done file based on uploading the plurality of files.

15. The non-transitory computer-readable medium of claim 14, wherein the one or more instructions, when executed by the one or more processors, further cause the device to:

upload, from the worker node and before querying the database, a file indicating a start of the worker node; and remove, for the worker node, the file indicating the start of the worker node after uploading the plurality of files.

16. The non-transitory computer-readable medium of claim 14, wherein the worker node is associated with two or more partitions in the plurality of partitions.

17. The non-transitory computer-readable medium of claim 14, wherein the done file encodes an indication of a delta run or a full run.

18. The non-transitory computer-readable medium of claim 14, wherein the done file encodes a list of corresponding files uploaded from the plurality of worker nodes.

19. The non-transitory computer-readable medium of claim 14, wherein a quantity of partitions in the plurality of partitions is preconfigured.

20. The non-transitory computer-readable medium of claim 19, wherein the done file encodes the quantity of partitions.

* * * * *